(12) United States Patent
Nishihara et al.

(10) Patent No.: US 6,325,651 B1
(45) Date of Patent: Dec. 4, 2001

(54) LIGHT EMITTING DEVICE, SOCKET DEVICE AND LIGHTING DEVICE

(75) Inventors: Hiroyoshi Nishihara, Tokyo; Katsunori Sato, Shioya-gun; Masayuki Katougi; Kazuaki Murata, both of Tokyo, all of (JP)

(73) Assignee: Moriyama Sangyo Kabushiki Kaisha (JP)

( * ) Notice: Subject to any disclaimer, the term of this patent is extended or adjusted under 35 U.S.C. 154(b) by 0 days.

(21) Appl. No.: 09/043,902

(22) PCT Filed: Mar. 31, 1997

(86) PCT No.: PCT/JP97/01100

§ 371 Date: Sep. 14, 1998

§ 102(e) Date: Sep. 14, 1998

(87) PCT Pub. No.: WO98/05055

PCT Pub. Date: Feb. 5, 1998

(30) Foreign Application Priority Data

Jul. 27, 1996 (JP) .................................................. 8/245496
Oct. 29, 1996 (JP) .................................................. 8/286338

(51) Int. Cl.⁷ .................................................. H01R 33/02
(52) U.S. Cl. .......................... 439/232; 439/226; 439/230; 439/357; 439/612
(58) Field of Search ....................... 313/318.02; 439/226, 439/230, 232, 233, 236, 239–244, 356, 357, 612, 619; 362/249

(56) References Cited

U.S. PATENT DOCUMENTS

| | | | |
|---|---|---|---|
| 2,366,252 | * | 1/1945 | Geiger . |
| 2,401,228 | * | 5/1946 | Noel . |
| 2,642,521 | * | 6/1953 | Easter ................................... 439/226 |
| 2,942,227 | * | 6/1960 | Hjelseth, Jr. .......................... 439/357 |
| 3,633,023 | * | 1/1972 | Castiglioni . |
| 4,080,030 | * | 3/1978 | Ustin ................................... 439/230 |
| 4,108,522 | * | 8/1978 | Favale ................................. 439/357 |
| 4,211,461 | * | 7/1980 | Wescott . |
| 4,521,839 | * | 6/1985 | Cook et al. .......................... 362/249 |
| 4,687,965 | * | 8/1987 | Sanders ............................... 439/617 |
| 4,713,019 | * | 12/1987 | Gaynor ................................ 439/232 |
| 4,906,891 | * | 3/1990 | Takagi ................................. 439/226 |
| 4,949,007 | * | 8/1990 | Takagi et al. ........................ 313/318 |
| 5,340,327 | * | 8/1994 | Koda ................................... 439/236 |

FOREIGN PATENT DOCUMENTS

| | | | |
|---|---|---|---|
| 176255 | * | 10/1953 | (AT) ................................... 439/232 |
| 630143 | * | 10/1949 | (GB) ................................... 439/232 |
| 61-117457 | * | 7/1986 | (JP) . |

* cited by examiner

Primary Examiner—Neil Abrams
(74) Attorney, Agent, or Firm—Morrison Law Firm

(57) ABSTRACT

A light emitting device (1) includes a tubular light emitter (11) and a pair of caps (14) disposed at both ends of the tubular light emitter. Each cap (14) includes a contact (24) and a pair of catching arms (27) both which of which project from the cap body (22) at approximately a right angle to the tube axis of the cap body (22). During assembly, catching arms (27) serve to protect contact (24) from damage and securely attach each cap (14) to the tubular light emitter. Each cap (14) includes a partition wall with a hole (30) connecting a conductive element (21) to contacts (24). The light emitter (11) may include a tube (12) containing one or more light elements (15) joined by wires (16) additionally operating as positioning elements (20). The socket (2) may include one or more groves for gaskets (42) providing a waterproof light emitter (11).

34 Claims, 18 Drawing Sheets

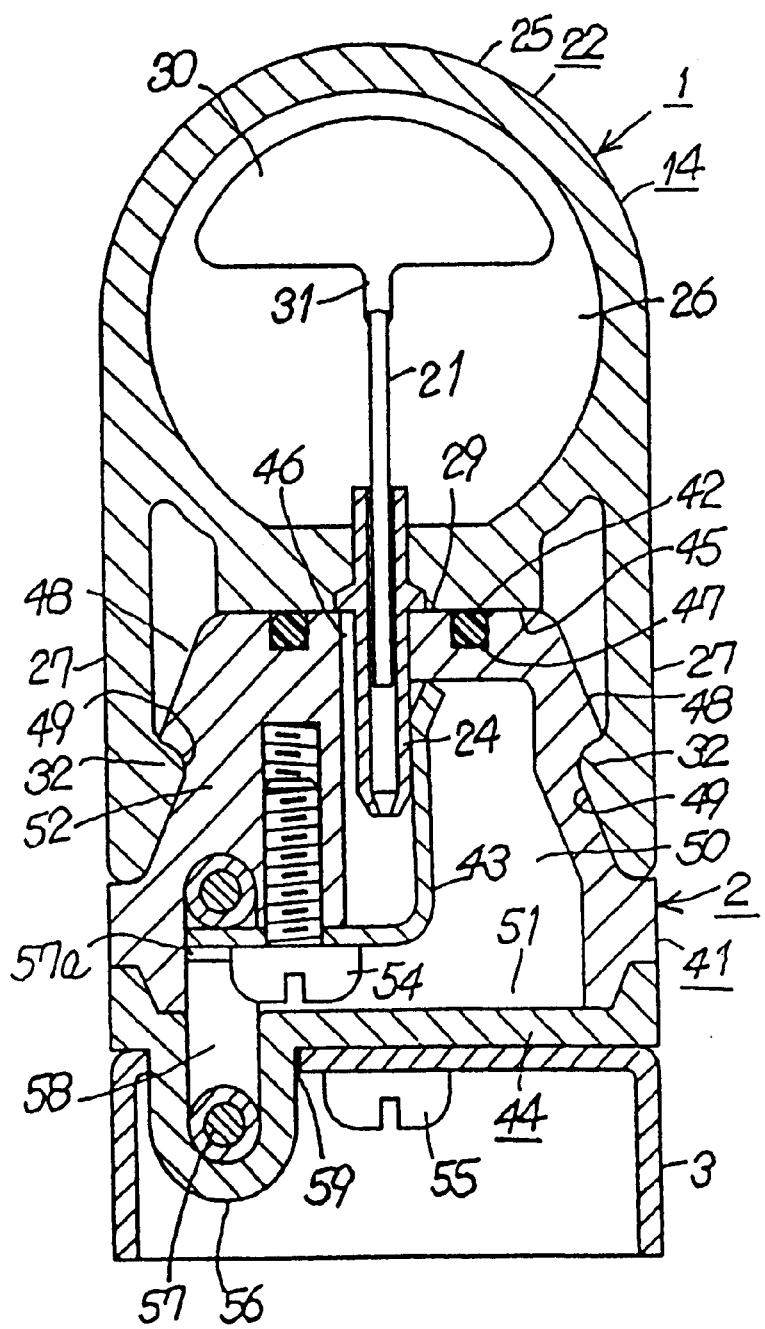
F I G. 2

LIGHT EMITTING DEVICE, SOCKET DEVICE AND LIGHTING DEVICE

TECHNICAL FIELD

BACKGROUND OF THE INVENTION

The present invention relates to a light emitting device having a tubular light emitter, socket devices to be connected to said light emitting device, and a lighting device including said light emitting device and socket devices.

BACKGROUND ART

An example of conventional light emitting devices is disclosed in Japanese Patent Laid-open No. 195557/1986, wherein sequentially arranged light emitting elements are connected in series and inserted into a flexible tube; caps for electrical connection are mounted on the respective two ends of the tube; and this tube is bent into the shape of, for example, a letter of the alphabet so that it can be used for what is generally called decorative illuminations. As the power consumption of the light emitting elements of a light emitting device described above is relatively low and their temperature when lit is low, there will be no problem even if some light emitting elements accidentally touch the inside of the tube. Due to its insufficient luminance, however, a light emitting device structured as above is not suitable to be used as a lighting device.

Another example is disclosed in Japanese Utility Model Laid-open No. 117457/1986, wherein sequentially arranged light emitting elements are connected in series and inserted into a glass tube, and caps for electrical connection are mounted on the respective two ends of the tube so that it can be used as the light source of a reading lamp. In order to prevent the light emitting elements from touching the inner surface of the glass tube, this device has a support portion which consisting of an outer shell portion and a small coil portion which are integrally connected to each other at a joint portion and welded to lead wires of the light emitting elements. Although this structure enables the device to use light emitting elements requiring relatively large power consumption, it presents a problem in that it requires a complicated, inconvenient operation of connecting the lead wires of the light emitting elements located at the two ends of the glass tube to the terminals at the respective ends of the glass tube.

Known among examples of caps to be provided at both ends of a tube having the above configuration is a structure described in Japanese Utility Model Publication No. 13536/1962 and Japanese Utility Model Public Disclosure No. 126347-1991, wherein each cap includes an insulating cap body to be attached to an end of the tube, and a contact for electrical connection is projected from the cap body at a right angle to the axis of the tube. Each socket device to which a cap structured as above is connected has a socket body provided with a metal fitting for connecting the contact, a holder for supporting the connected cap, and other necessary members.

When arranging a plurality of light sources along the axis of a tube to produce a line illumination design (illumination formed by straight and/or curved lines rather than planes), the above configuration of a light emitting device and a socket device, wherein the socket devices are not disposed on the axis of the tube of the light emitting device, has advantages in that it is free from the problem of a socket device forming an undesirable dark part; the continuity of the luminescent part is ensured; and that the effect of a continuous illumination design can be achieved to the full extent.

In the state where the light emitting device is not connected to the socket devices, however, the contacts project from the sides of the respective caps without a cover and are prone to be exposed to an external force when transported or connected to a socket device. Should a contact be deformed by such an external force, connection to a socket device may become impossible or, granting that the connection is managed, there is the danger of a failure occurring in electrical connection. The above configuration presents another problem in that a special buffer mechanism or the like for protecting the contacts is necessary in order to prevent inadvertent deformation of the contacts during transportation or in other occasions.

OBJECTS OF THE INVENTION

In order to solve the above problems, an object of the present invention is to provide a light emitting device which is ensured to be capable of projecting its contacts and be supported in the state where it is electrically connected to the sockets, a socket device or socket devices to which said light emitting device can be connected, and a lighting device which is provided with said light emitting device and socket device or socket devices.

A light emitting device according to the invention includes a tubular light emitter and a pair of caps, each cap having an insulating cap body to be attached to each end of the tubular light emitter, a contact to be electrically connected to the tubular light emitter and projecting from the cap body at approximately a right angle to the tube axis, and a pair of catching arms respectively disposed at both sides of the contact and extending virtually in the same direction as the contact.

As the pair of catching arms of each cap serve as a protector in the state where the cap is not yet mounted on a socket device, its contact is ensured to be protected when the cap is being transported or mounted on a socket device. Further, even in a configuration where electrical connection is achieved simply by forcing or otherwise inserting a contact into a socket device, electrical connection of the light emitting device can be reliably maintained by engaging the pair of catching arms with a receiving member such as a socket device or a lighting fixture.

The tubular light emitter includes conductive elements led out of the ends of the tubular light emitter. Each cap body includes a cylindrical barrel portion, of which one end is mounted over an end of the tubular light emitter, and a partition provided at the middle of the interior of the barrel portion and permitting the corresponding one of said conductive elements to pass therethrough from the one side to the other side of the partition, said one side and the other side respectively facing the one end and the other end of the barrel portion, wherein said contact is connected to the conductive element at the other side of the partition and projects from the barrel portion.

By mounting an end of the barrel portion of the cap body over an end of the tubular light emitter and passing a conductive element from the one side to the other side of the partition in the barrel portion of the cap body, assembly of the device becomes easier in that the conductive element can be easily connected to the contact in the section of the barrel portion where the other end is located.

According to another feature of the invention, the tubular light emitter includes conductive elements led out of the ends of the tubular light emitter, and each cap body includes a cylindrical barrel portion, of which one end is mounted over an end of the tubular light emitter, and a partition integrally formed with the barrel portion at the middle of the interior of the barrel portion and permitting the corresponding one of said conductive elements to pass therethrough from the one side to the other side of the partition, said one side and the other side respectively facing the one end and the other end of the barrel portion, and a blocking member formed as a separate member and attached to the other end of the barrel portion.

By mounting an end of the barrel portion of the cap body over an end of the tubular light emitter and passing a conductive element from the one side to the other side of the partition in the barrel portion of the cap body, assembly of the device becomes easier in that the conductive element can be easily connected to the contact in the section of the barrel portion where the other end is located. The above configuration has additional benefits in that a partition can be easily provided in a barrel portion by means of integral formation with the barrel portion; the other end of the barrel portion can be closed by a blocking element after connection of a conductive element; and that the appearance can be improved.

According to yet another feature of the invention, the tubular light emitter includes conductive elements led out of the ends of the tubular light emitter, and each cap body includes a cylindrical barrel portion, of which one end is mounted over an end of the tubular light emitter, and a partition provided at the middle of the interior of the barrel portion and having a positioning portion that positions the conductive element passing from the one side to the other side of the partition, said one side and the other side respectively facing the one end and the other end of the barrel portion.

By mounting an end of the barrel portion of the cap body over an end of the tubular light emitter and passing a conductive element from the one side to the other side of the partition in the barrel portion of the cap body, assembly of the device becomes easier in that the conductive element can be easily connected to the contact in the section of the barrel portion where the other end is located. In addition, as a conductive element passing through the partition from the one side to the other side thereof is positioned by means of a positioning portion of the partition, the above configuration facilitates an connecting operation.

According to yet another feature of the invention, the tubular light emitter includes conductive elements led out of the ends of the tubular light emitter, and each cap body includes a cylindrical barrel portion, of which one end is mounted over an end of the tubular light emitter, and a partition provided at the middle of the interior of the barrel portion and having a through hole and a positioning portion that positions the conductive element passing therethrough from the one side to the other side of the partition, said one side and the other side respectively facing the one end and the other end of the barrel portion.

By mounting an end of the barrel portion of the cap body over an end of the tubular light emitter and passing a conductive element from the one side to the other side of the partition in the barrel portion of the cap body, assembly of the device becomes easier in that the conductive element can be easily connected to the contact in the section of the barrel portion where the other end is located. In addition, a through hole formed in each partition makes it easy to pass a conductive element from one side of the partition to the other side, while a positioning portion of each partition enables positioning of the conductive element passed from the one side of the partition to the other side. Thus, a connecting operation can be simplified.

According to yet another feature of the invention, each cap body includes a cylindrical barrel portion having a cap flat portion which is formed on a part of the side face thereof, and said contact projects from the cap flat portion of the barrel portion.

With the configuration as above, when the cap is attached to a socket device, positioning can be done by joining the cap flat portion to the socket device. Furthermore, a waterproof structure can be easily obtained by means of, for example, disposing a packing between the cap flat portion and the socket device.

According to yet another feature of the invention, the tubular light emitter includes a rigid, translucent tube and a light emitting element series which comprises a plurality of light emitting elements and installed in said tube.

The tubular light emitter may be structured by using, for example, small incandescent lamps.

A socket device according to the invention is a socket device to be combined with said light emitting device and comprises an insulating socket body, a receiving blade and a lid, said socket body having an insertion hole, which is formed in the end face of the socket body and allows a contact of the light emitting device to be inserted therethrough, slanted surfaces respectively formed on opposite sides of the socket body, catching indentations formed continuously with the respective slanted surfaces, and a hollow portion formed inside the socket body; said receiving blade contained in the hollow portion of the socket body and permitting said contact to be electrically connected thereto; and said lid blocking the hollow portion of the socket body.

By inserting a cap of the light emitting device into a socket device, the contact of the cap can be electrically connected to the receiving blade through the insertion hole at the end face of the socket body. At that time, by inserting the cap into the socket device with the pair of catching arms of the cap positioned at both sides of the socket, the catching arms can be guided along the respective slanted surfaces of the socket body and easily fitted in the catching indentations. Therefore, the above configuration facilitates fitting of the light emitting device to the socket devices and also ensures the light emitting device to be maintained electrically connected.

According to yet another feature of the invention, a socket body includes a socket flat portion formed around the insertion hole at the end face of the socket body, an annular circumferential groove so formed in the socket flat portion as to surround the insertion hole, and a packing disposed in the circumferential groove.

A waterproof structure can be easily obtained by disposing a packing between a cap and a socket device.

A lighting device according to the invention includes a base; a light emitting device; and a pair of socket devices; said light emitting device including a tubular light emitter and a pair of caps, each cap having an insulating cap body to be attached to each end of the tubular light emitter, a contact to be electrically connected to the tubular light emitter and projecting from the cap body at approximately a right angle to the tube axis, and a pair of catching arms respectively provided at both sides of the contact and extending virtually in the same direction as the contact; each of said socket devices including an insulating socket body, a receiving blade and a lid, said socket body having an insertion hole, which is formed in the end face of the socket body and allows a contact of the light emitting device to be inserted therethrough, slanted surfaces respectively formed on opposite sides of the socket body, catching indentations formed continuously with the respective slanted surfaces, and a hollow portion formed inside the socket body; said receiving blade contained in the hollow portion of the socket body and permitting said contact to be electrically connected thereto, and said lid blocking the hollow portion of the socket body; and said pair of socket devices separately mounted on said base, at opposite locations.

As the pair of catching arms of each cap of the light emitting device serve as a protector in the state where the cap is not yet mounted on a socket device, its contact is ensured to be protected when the cap is transported or mounted on a socket device, electrical connection of the light emitting device can be reliably maintained by engaging the pair of catching arms respectively in the catching indentations of the socket device. Further, by inserting a cap of the light emitting device into a socket device, the contact of the cap can be electrically connected to the receiving blade through the insertion hole at the end face of the socket body. At that time, by inserting the cap into the socket device with the pair of catching arms of the cap positioned at both sides of the socket, the catching arms can be guided along the respective slanted surfaces of the socket body and easily fitted in the catching indentations. Therefore, the above configuration facilitates fitting of the light emitting device to the socket devices and also ensures the light emitting device to be maintained electrically connected.

BRIEF DESCRIPTION OF DRAWINGS

FIG. 2 is a sectional view of the same taken along the line A—A of FIG. 1;

DETAILED DESCRIPTION OF THE PREFERRED EMBODIMENT

The configuration of the first embodiment of the present invention is described in the following by referring to FIGS. 1 to 4.

In said drawings, a lighting device comprises a light emitting device 1, a pair of socket devices 2, and a base 3.

Figure 3:
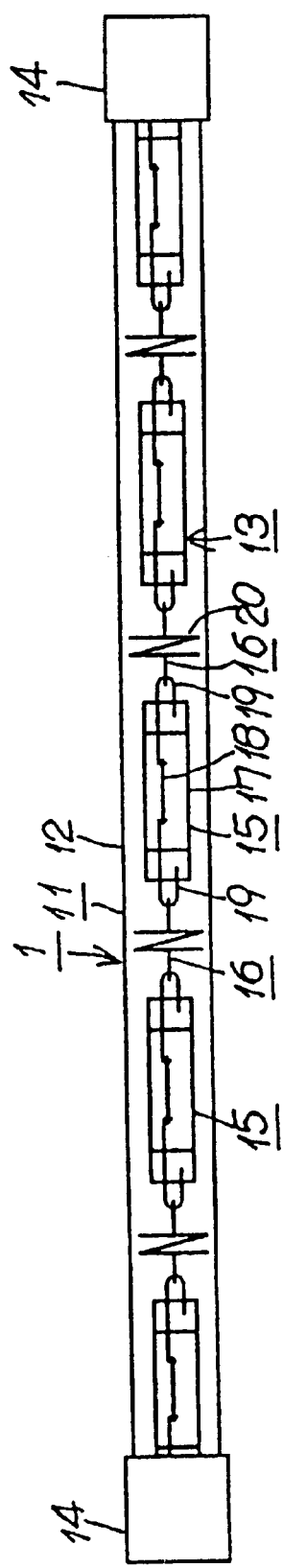
FIG. 3 is a top view of a light emitting device.

In FIG. 3, the light emitting device 1 has a tubular light emitter 11 which is comprised of a tube 12 and a light emitting element series 13. A pair of caps 14 are respectively attached to both ends of the tube 12.

The tube 12 of the tubular light emitter 11 is a transparent, straight glass tube having a circular section and open at both ends.

The light emitting element series 13 consists of a plurality of light emitting elements 15 (for example five light emitting elements) linked by means of conductive wires 16. Each light emitting element 15 is an incandescent lamp having a bulb 17 made of transparent glass. The bulb 17 has a filament 18 contained therein and conducting members respectively led out from sealing portions formed at the two ends of the bulb 17. The bulb 17 is filled with xenon gas. A ring-shaped position restricting element 20, which also serves as a tension applying element, is integrally coiled around the middle portion of each conductive wire 16.

The caps 14 are attached to the respective two ends of the tube 12.

Figure 1:
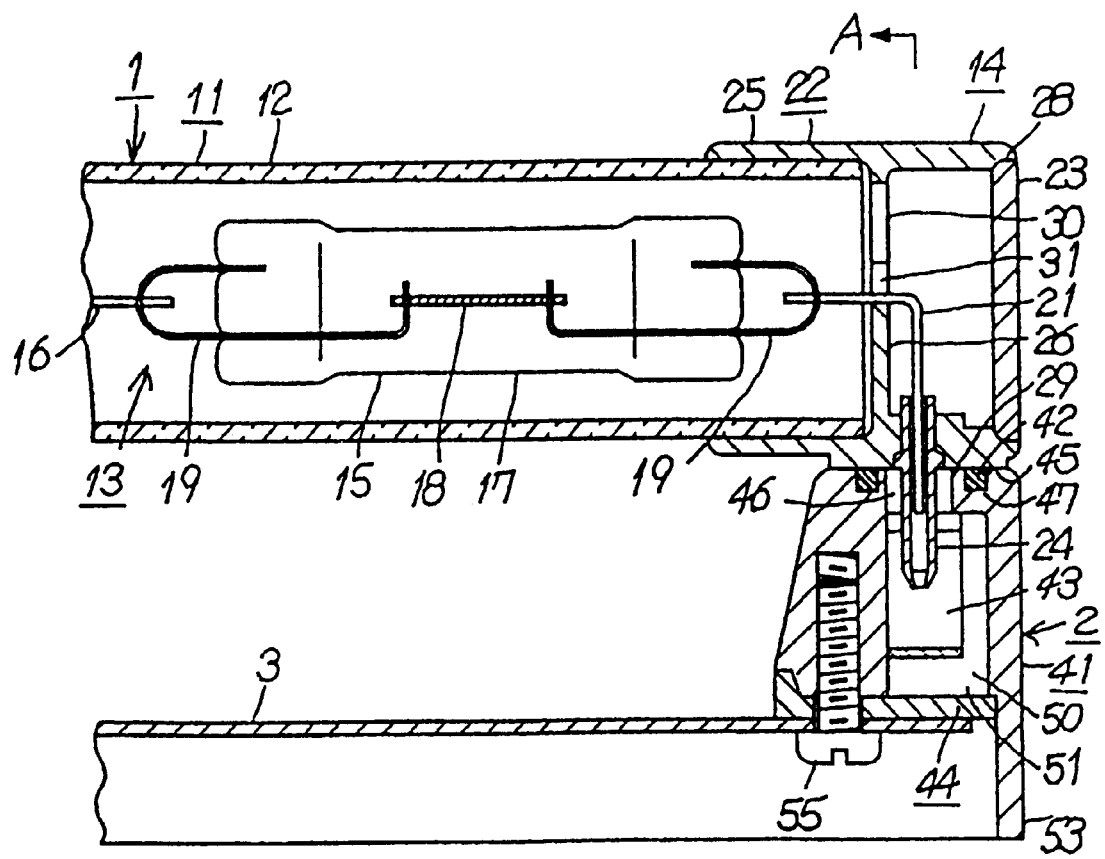
FIG. 1 is a sectional view of a part of a lighting device according to a first embodiment of the present invention.

Referring to FIGS. 1 and 2, a conductive element 21 which is a conductive wire or the like and connected to the corresponding conducting member 19 of the light emitting element 15 at each end of the tubular light emitter 11 is led out from the end of the tubular light emitter 11 into the associated cap 14.

Each cap 14 is comprised of a cap body 22, a blocking element 23 and a contact 24.

Said cap body 22 is made of an insulating synthetic resin such as polycarbonate resin and includes a barrel portion 25, a partition 26 and a pair of catching arms 27. The barrel portion 25 is in a cylindrical shape open at both ends, with one end fitted around the outer surface of the end of the tube 12. An opening 28 to which the blocking element 23 is attached is formed at the other end of the barrel portion 25. A cap flat portion 29 is formed on a part of the wall of the barrel portion 25, between the pair of catching arms 27. The partition 26 is integrally formed with the barrel portion 25, at a location about the middle of the interior of the barrel portion 25. The partition 26 is provided with a generally semi-circular through hole 30 and a shallow, slit-like positioning portion 31, which is located at the center of the chord of said semi-circle of the through hole 30.

The blocking element 23 is formed of an insulating synthetic resin such as polycarbonate resin in the shape of a disk and brought into engagement with the opening 28 of the cap body 22, thereby blocking the opening 28, by the elastic force of the barrel body 25.

The contact 24 is a conductive hollow pin which is formed at the other end of the barrel portion 25, between the partition 26 and the opening 28, and projects therefrom through the center of the cap flat portion 29 of the barrel portion 25, at an approximately right angle to the axis of the cap body 22.

Each conductive element 21 led out from an end of the light emitting element series 13 is introduced through the through hole 30 of the partition 26 of the corresponding cap 14 into the cap 14 and dropped into the positioning portion 31. Thus, the leading out of the conductive element 21 is completed. Then, the conductive element 21, now bent into an L-shape, is inserted into the base end portion of the contact 24 and electrically and mechanically connected to the contact 24 by means of pressing force or welding.

The pair of catching arms 27 are formed as an integral body with the barrel portion 25 and respectively extend downward from the two opposite sides of the barrel portion 25 so that each catching arm 27 faces a side of the contact 24 that protrudes the barrel portion 25. A catching protrusion 32 protruding inward is formed at the end of each catching arm 27.

In order to assemble the light emitting device 1 structured as above, the light emitting element series 13 is produced beforehand. The conductive elements 21 led out from both ends of the light emitting element series 13 are bent into an L-shape beforehand. The light emitting element series 13 is inserted into a tube 12, and an end of the barrel portion 25 of each cap 14 is then attached to an end of the tube 12. Prior to this attaching operation, an appropriate quantity of an adhesive agent is applied to the inner surface of the barrel portion 25. Thereafter, a tool such as a pair of tweezers, cutting pliers or the like is inserted from the opening 28 at the other end of cap 14 in order to hold and pull a conductive element 21 of the light emitting element series 13 through the through hole 30 of the partition 26 to the part of the barrel 25 where a contact 24 is located and, while dropping the conductive element 21 into the positioning portion 31 of the partition 26, insert the end of the conductive element 21 into the base end of the contact 24. Then, the contact 24 and the conductive element 21 are electrically and mechanically connected by means of, for example, pressing them against each other. By blocking the opening 28 thereafter with a blocking element 23, the assembly of the light emitting device 1 is completed.

The socket device 2 basically comprises a socket body 41, a packing 42, a receiving blade 43 and a lid 44.

The socket body 41 is made of an insulating synthetic resin such as polybutylene terephthalate resin and includes a socket flat portion 45 formed on its upper surface (the end face). An insertion hole 46 that allows the associated contact 24 to be inserted therein is formed at the center of the socket flat portion 45, and an circumferential groove 47 for containing the packing 42 therein is formed around the insertion hole 46. A slanted surface 48 and a catching indentation 49 for catching the catching protrusion 32 of the corresponding catching arm 27 therein are formed on each of the two opposite sides of the socket body 41, each catching indentation 49 located directly under the corresponding slanted surface 48 as an integral, continuous body with the slanted surface 48. The inside of the socket body 41 is formed into a hollow portion 50 which communicates with the insertion hole 46, and an opening 51 communicating with the hollow portion 50 is formed at the bottom of the socket body 41 and blocked by the lid 44. A mounting base 52 is formed in the hollow portion 50, at a side of the zone in which the contact 24 is inserted. Furthermore, an end face portion 53 vertically extending downward is formed on the end face of the socket body 41.

Each packing 42, which may be an O-ring or the like, is disposed such that a part of the packing contained in the circumferential groove 47 protrudes above the upper surface of the socket flat portion 45 when no pressure is applied to the packing 42.

The receiving blade 43 is made of a conductive material such as a leaf spring or the like and is generally formed in the shape of an L, with its base end fastened to the mounting base 52 by means of a screw 54, and its tip so disposed as to be capable of entering sideways into the zone in which the contact 24 is inserted and being pressed against the side of the contact 24.

The lid 44 is made of such a material as flexible silicone rubber or the like and brought into fluid-tight engagement so as to block the opening 51 of the socket body 41. The lid 44 is disposed snugly between the opening 51 and the base 3, and solidly fastened to the base 3 and screwed by means of a screw 55 that is inserted from the back of the base 3 into the socket body 41.

Figure 4:
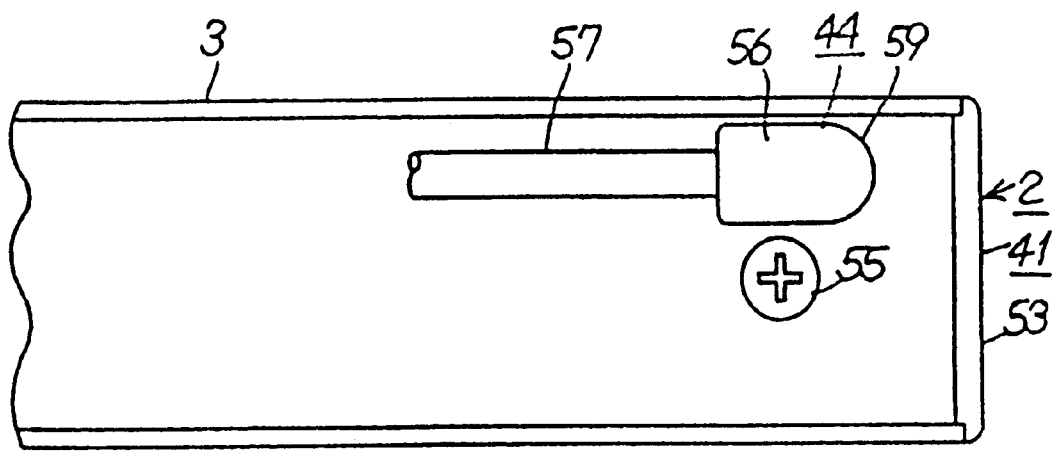
FIG. 4 is a bottom view of the lighting device.
Figure 5:
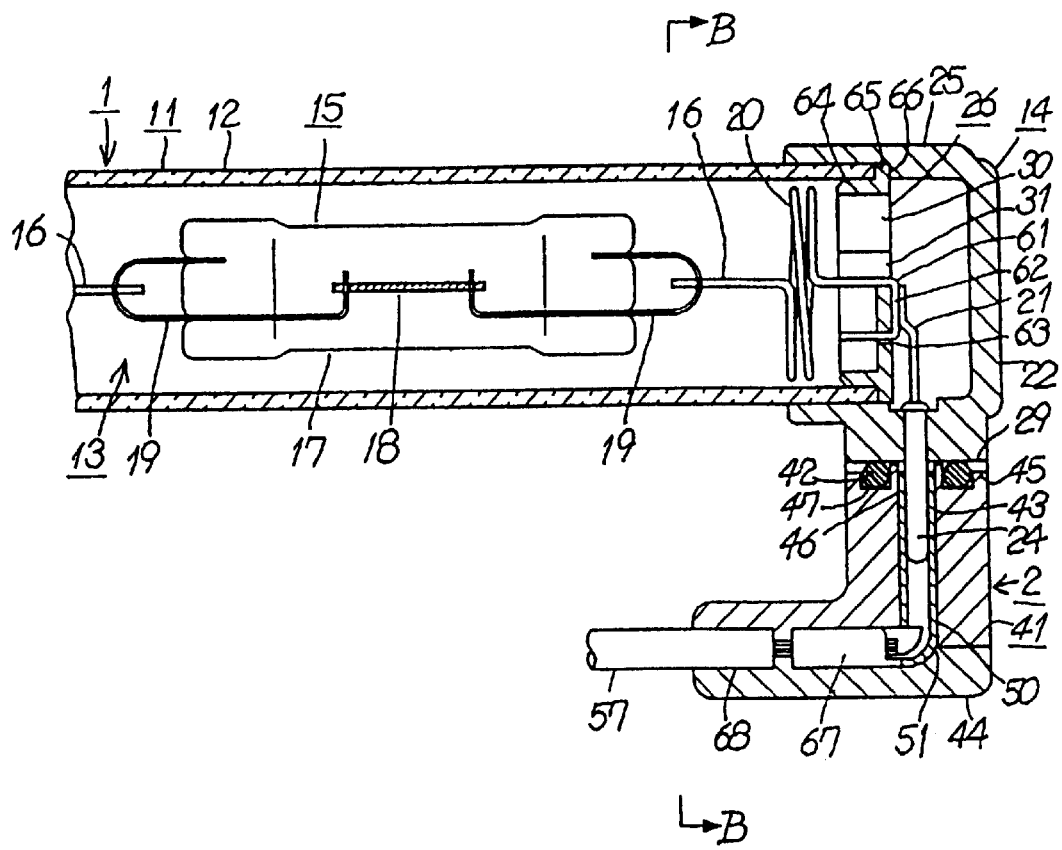
FIG. 5 is a sectional view of a part of a lighting device according to a second embodiment of the present invention.
Figure 6:
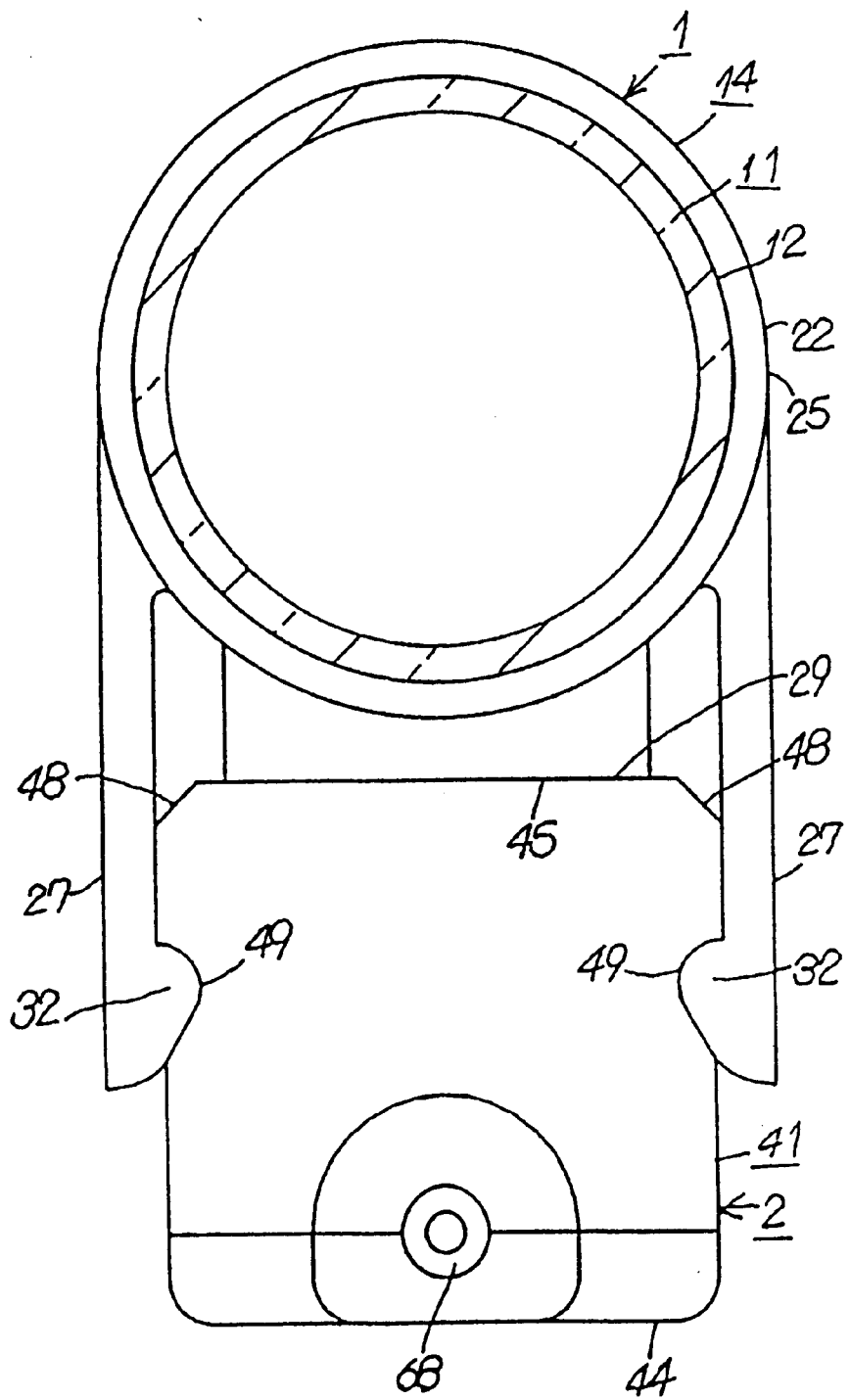
FIG. 6 is a schematic sectional view of the same taken along the line B—B of FIG. 5.

A part of each lid 44 is formed into a protuberant portion 56 communicating with the hollow portion 50 of the socket body 41 and projecting. Referring to FIG. 4, the protuberant portion 56 has an insertion hole (not shown) that is bored through the side of the protuberant portion facing the center of the device and permits a power line 57 to be inserted therein so that the power line 57 can be introduced from the outside through the protuberant portion 56 into the socket 41. More precisely, when viewed from the point of view of having FIG. 2 directly in front of the viewer, the power line 57 looks as if it were introduced from the back of the sheet of paper containing FIG. 2 into the protuberant portion 56, made a U-turn between the sheet and the viewer and were directed onto the upper surface of the base end of the receiving blade 43. Then, by folding core wires 57a of the power line 57, which are exposed from the end of the insulation coating of the power line 57, downward along the base of the receiving blade 43 and connecting the core wires 57a to the back face of the receiving blade 43, the power line 57 is electrically connected to the receiving blade 43 and secured by the tensile force at the same time. The socket body 41 is provided with a tongue 58 extending downward as an integral body with the socket body 41 so that the protuberant portion 56 and the tongue 58 both press against the power line 57, thereby making the lead-in portion of the power line 57 waterproof. If it is necessary, the waterproofing capability may be ensured by filling the space defined by the protuberant portion 56, the tongue 58 and the power line 57 with silicone adhesive agent.

The base 3 is made of a metal plate bent into the shape of a U open at the bottom, of which both lengthwise ends are respectively blocked by the end face portions 53 of the socket bodies 41. An insertion hole (not shown) in which a screw 55 is inserted and a cutout portion 59 through which the protuberant portion 56 of a lid 44 is inserted are formed near each end of the base 3, at the location where a socket is mounted.

With the configuration as above, each socket body 41 and lid 44 are integrally fastened to the base 3 by disposing the socket body 41 and lid 44 at the socket mounting position at each end of the base 3 in the state where the lid 44 is engaged in the opening 51 of the socket body 41, and firmly screwing the screw 55 from the back of the base 3 into the socket body 41.

Mounting of the lighting device structured as above can be done by mounting the base 3 at a desired position of a structure such as a building; completing the wiring; and inserting the caps 14 at both ends of the light emitting device into the respective socket devices 2. As a result, the contact 24 of each cap 14 is inserted into the insertion hole 46 of the corresponding socket body 41 so that the contact 24 is electrically connected to the receiving blade 43 while deforming the receiving blade 43 against its elastic force. At the same time, while being deformed against their own elastic force, the two catching arms 27 of the cap 14 become caught in the respective catching indentations 49 by way of the slanted surfaces 48 of the socket body 41. At this engagement position, the cap flat portion 29 of the cap 14 comes into contact with the packing 42 and elastically flattens the packing 42 so that the contact between the cap 14 and the socket body 41 becomes watertight.

The light emitting device 1 can be removed from a socket device 2 by applying outward pressure to the pair of catching arms 27 of the cap 14 against the elastic force of the catching arms 27 and, while enlarging the catching arms as above, simply by separating the cap 14 from the socket body 41 in the state where the catching protrusions 32 of the catching arms 27 are disengaged from the catching indentations 49 of the socket body 41. As a result, the contact 24 is removed from the receiving blade 43 and electrically disconnected.

The structural features, functions and effects according to the first embodiment are explained hereunder.

A feature of the first embodiment lies in inclusion of an elongated tube 12 of which at least the light inlet portion is translucent; a light emitting element series 13 inserted in the tube 12, the light emitting element series having a plurality of sequentially connected light emitting elements 15 and conductive elements extended from the two respective ends; and caps 14 each of which includes a barrel portion 25, a partition 26, a contact 24 and a blocking element 23, said barrel portion 25 having one end fitted over an end of the tube 12 and the other end being open, the partition 26 having a through hole 30 and being located at the middle of the interior of the barrel portion 25 so as to position the corresponding conductive element 21 of the light emitting element series 13 drawn out through the through hole 30, the contact 24 so disposed between the partition 26 and an opening 28 at said other end of the barrel portion 25 as to permit the conductive element 21 of the light emitting element series 13 to be connected thereto, the operating portion of the contact 24 exposed to the outside, and the blocking element 23 blocking the opening 28 of the barrel portion 25. According to the above configuration, the partition 26 is provided in a cap 14, and a conductive element 21 introduced through the through hole 30 is first positioned and then connected to the contact 24. Therefore, the above configuration facilitates the assembly operation in that the conductive elements 21 of the light emitting element series 13 can be taken out and assembled in the state where the caps 14 are already attached to the tube 12.

Each partition 26 is characterized in being formed as an integral body with a barrel portion 25; it may be molded together with a barrel portion 25, or it may be bonded, welded or otherwise solidly attached to a barrel portion 25 after being formed separately from the barrel portion. This integration of a partition 26 with a barrel portion 25 eliminates the danger of inadvertent movement of partition 26 and consequently prevents the light emitting element series 13 from inadvertently moving from its given position.

Another feature of a partition 26 lies in that its through hole 30 is in an approximately semi-circular shape. As a result, even when a conductive element 21 introduced from an end of the light emitting element series 13 is already bent into the shape of an L or the like so as to facilitate its connection to a contact 24, it is easier to take out the bent portion of the conductive element 21 through the through hole 30 because the through hole 30 is formed in an approximately semi-circular. In order to facilitate positioning of a conductive element 21, a shallow slit may be formed at the chord of the semi-circle so that the positioning can be done by dropping the conductive element 21 to the bottom of the slit. As the structure described above increases the mechanical strength of partitions 26, the partitions 26 can be also used to secure the light emitting element series 13 by means of tensile force.

The above embodiment is also characterized in that its caps 14 are provided at the respective two ends of the tube 12. Therefore, the embodiment can provide what is generally called a dual-cap type tubular light emitter 11.

Another feature of the embodiment lies in that each contact 24 projects from a cap 14 in a direction intersecting the axis of the tube 12. By attaching the caps 14 of the tubular light emitter 11 to the respective socket devices 2, the tubular light emitter 11 can be disposed approximately parallel to the mounting surface. Although the above structure is suitable for a dual-cap type tubular light emitter 11, the light emitter 11 may also be of a single-cap type. In case of a single-cap type tubular light emitter 11, the light emitter 11 may be supported at the proximity of the tube end by a separately prepared holder.

Each cap 14 also has a feature of a pair of catching arms 27 flanking a contact 24 and extending in the same direction as the contact 24. Even in case of a structure wherein electrical connection is achieved simply by inserting or pressing the contacts 24 of the tubular light emitter 11 into or against the socket devices 2, inadvertent dislocation and electrical disconnection of the tubular light emitter 11 is prevented by providing each cap 14 with the pair of catching arms 27 and bringing these catching arms 27 in catching indentations 49 formed in the socket devices 2, the base 3 or in other appropriate members. The above structure is also convenient to dispose a packing 42 between the periphery of the contact 24 of a cap 14 and a socket device 2 in order to make the region waterproof, because a sufficient pressure to achieve the waterproof effect can be applied to the area between the cap 14 and the socket device 2 simply by bringing the catching arms 27 into engagement with the designated fixed portions as described above. The catching arms 27 extended from each cap 14 also serve as a protector to mechanically protect the associated contact 24 in the state where the tubular light emitter 11 is not mounted on the socket device 2. Furthermore, even if water is splashed on the top of a cap 14, the water flows down the catching arms 27. Thus, the above structure is also capable of improving the waterproof characteristic of the device.

A light emitting element series 13 according to the embodiment has a feature wherein its light emitting elements 15 are connected to one another by means of conducting members 19 led out of the light emitting elements 15. As conducting members 19 of each light emitting element 15 are used as at least a part of the linking mechanism for linking in a chain-like manner the light emitting elements 15, a number of components necessary for the linkage can be minimized. Further, this feature is suitable for a configuration wherein light emitting elements 15 are connected in series.

According to another feature of the embodiment, a light emitting element series 13 includes a position restricting element 20 disposed between each two adjacent light emitting elements 15 in order to restrict the position of the light emitting element series 13 with respect to the direction perpendicular to the axis of the tube 12. Although it is preferable that each position restricting element 20 has an outline resembling the sectional shape of the interior of the tube 12, a combination of adjacent position restricting elements 20 may form an outline that resembles the internal section of the tube 12. For example, one of a pair of position restricting elements 20 adjacent to each other may be generally in an semi-circular shape when viewed from the axial direction of the tube 12, while the other position restricting element 20 may be in the shape of a semi-circle rotated by 180°. Such a configuration is sufficiently functional for restricting the positions of light emitting element in cases where the light emitting elements are relatively short and arranged at short intervals. In other words, a position restricting element 20 may have any structure as long as it is effective in restricting the position of the light emitting element series 13 in the tube 12. Providing position restricting elements 20 prevents the light emitting elements 15 from inadvertently touching the inner surface of the tube 12; this is especially effective in cases where the tube 12 is curved.

According to another feature of the embodiment, each position restricting element 20 is formed of a conductive element 21 which connects light emitting elements 15 to each other. By forming position restricting elements 20 of conductive elements 21 which connect light emitting elements 15, the structure is simplified, and it is also become possible to use position restricting elements 20 to apply tensile force. More precisely, when tensile force is applied to the light emitting element series 13 by connecting or otherwise affixing the conductive elements 21 drawn out of the respective two ends of the light emitting element series 13 to the contacts 24 in the state where the conductive elements 21 are pulled, inadvertent movement of the light emitting element series 13 in the tube 12 is reduced, and, therefore, unpleasant scratching noises is minimized.

According to yet another feature of the embodiment, each light emitting element 15 is comprised of an incandescent lamp including a bulb 17, a filament 18 disposed in the bulb 17 and conducting members 19 respectively led out from sealing portions formed at both ends of the bulb 17. The attached drawings show a preferable configuration in cases where the light emitting elements 15 are incandescent lamps, and especially suitable for serial connection, because an incandescent lamp has conducting members 19 at both ends. However, the present invention is not limited to electrically serial connection; if necessary, it can be made applicable to parallel connection by separating electrical connection of the light emitting elements 15 from mechanical connection thereof or by other suitable ways.

Yet another feature of the embodiment lies in that the embodiment has said light emitting device 1 and socket devices 2, each socket device 2 including a receiving blade 43 for receiving a contact 24 of the light emitting device 1 so as to permits electrical connection of the contact 24, and an insulating socket body 41 containing said receiving blade 43. A lighting device can be constructed simply by attaching the light emitting device 1 to the socket devices 2, thereby supporting the light emitting device 1. As a light emitting device 1 can be in an elongated shape and/or have any desired length, it can be easily used for lighting fixtures in a store or, if disposed in an elongated groove, for line illumination. Thus, the embodiment facilitates line illumination.

Yet another feature of the embodiment lies in that the embodiment has said light emitting device 1 and socket devices 2, each socket device 2 including a receiving blade 43 for receiving a contact 24 of the light emitting device 1 so as to permits electrical connection of the contact 24, and an insulating socket body 41 containing said receiving blade 43 and having catching indentations 49 respectively formed at both sides of the socket body so that the catching arms 27 of the light emitting device 1 can be respectively engaged in the catching indentations 49 of the socket bodies 41. By forming catching indentations 49 respectively at the opposite sides of each socket body 41 so as to permit the catching arms 27 of the light emitting device 1 to be engaged in the respective catching indentations 49, the light emitting device 1 is prevented from being inadvertently dislocated from the socket devices 2. Furthermore, the above configuration can be made waterproof by providing a packing 42 between the peripheral surface of the contact 24 of each cap 14 and the socket body 41 of the corresponding socket device 2.

According to yet another feature of the embodiment, the bottom of each insulating socket body 41 is an open end and covered by an insulating, flexible lid 44, through which a power line 57 is introduced into the socket body 41. The attached drawings show a preferable configuration in cases where a power line 57 is introduced into a socket device 2 from the bottom of the socket device 2. According to this configuration, it is easier to form a waterproof structure, because the bottom of a socket device is covered by a flexible insulating lid 44, and a power line 57 is introduced through this lid 44.

According to yet another feature of the embodiment, the embodiment includes an elongated base 3, a pair of socket devices 2 respectively provided at the two opposite ends of the base 3, and said light emitting device 1 so mounted as to be sandwiched between these two socket devices 2. The base 3 may be formed of metal or synthetic resin. As a pair of socket devices 2 respectively provided at the two opposite ends of the base 3, a lighting device having this feature can be used like a straight-tube type fluorescent lamp. Mounting and electrical connection of the light emitting device 1 can be simultaneously done by mounting the base 3 on a building or a structure and inserting the contacts 24 of the light emitting device 1 into the respective socket devices 2.

In the features described above, definition and technical concepts of the terms are as follows unless specifically described otherwise.

A tube 12 may be in any shape or configuration as long as at least its light inlet portion is translucent. For example, its entire body may be formed of a transparent glass tube with its inner or outer surface made into a light-shielding reflecting mirror by means of vapor deposition of a metal or other appropriate means, except for the light inlet portion or portions where light emitted from the light emitting element series contained in the tube is directed to the outside of the tube, said light inlet portion or portions remaining translucent in the shape of a slit. The term "translucent" means having the quality of permitting light to pass through; it may be transparent or light-diffusing, and may also be colored.

A tube 12 may be rigid or flexible. In case of a rigid tube, such a material as glass, polycarbonate resin, acrylic resin or the like may be used. In case of a flexible tube, a material such as nylon, vinyl chloride or the like may be used, but it is necessary to select such light emitting elements 15 as to generate least heat in order to protect the tube 12 from being softened or melted by the heat generated by the light emitting element series 13. In cases where the light emitting element series 13 is incorporated in the tube 12 in the state where tensile force is applied to the light emitting element series 13 as described later, unpleasant scratching noises resulting from inadvertent contact of the light emitting element series 13 with the tube 12 can be reduced. However, if the tube 12 is flexible, it is difficult to apply tensile force to the light emitting element series 13.

The tube 12 is "elongated" means that the axial length of the tube is greater than the diameter of the open end or the open ends. Therefore, the tube 12 may have any length as long as the above condition is satisfied.

Although it is preferable that the tube 12 is open at both ends, this is not an essential requirement; it is sufficient that at least one end is open.

The tube 12 does not have to be a straight tube, and any curved shape is permissible; the tube 12 may be curved into the shape of, for example, an arc of a desired angle, a ring, a U or an L.

The shape of the section of the tube 12 is not limited to a circle but may be of any appropriate shape, such as an ellipse or a rectangle.

A light emitting element series 13 has to be comprised of a plurality of light emitting elements 15 mechanically arranged in sequence like a chain. This does not mean that they have to be electrically connected in series; they may be connected in parallel as needed, provided that, however, conductive elements 21 are extended at least from both ends of the light emitting element series 13.

Various elements, such as incandescent lamps, discharge lamps, light emitting diodes, etc., may be used as light emitting elements 15. Although it is preferable that conducting members 19 of each light emitting element 15 are led out from both ends of the light emitting element 15, this is not an essential condition; they may be drawn out together from one end as needed. In cases where the light emitting elements 15 are incandescent lamps, by filling their bulbs 17 with xenon gas or krypton gas at an appropriate pressure, their power consumption density, in other words the amount of generated light, can be increased while the life-span of the lamps can be substantially extended. The structure of a conducting member 19 is not limited to the form of a wire: it may be in any form, including a pin.

The number of light emitting elements 15 is determined primarily by dimensional conditions and electrical conditions of the tube 12 and each light emitting element 15. More precisely, the dimensional conditions specifies how many light emitting elements 15 having a specified length can be contained in the tube 12 that has a given length. As for electrical conditions, in cases where the light emitting elements 15 are connected in series, the number of light emitting elements 15 is determined by a value produced by dividing the power supply voltage by the voltage applied to the light emitting elements 15. Here, if the voltage applied to the light emitting elements 15 is greater than the nominal rated voltage, which means that an overvoltage is applied to the light emitting elements 15, the amount of generated light may be increased to a certain extent. However, such a high voltage is not desirable, because it tends to reduce the life span of the light emitting elements. In contrast to this, when a voltage lower than the nominal rated voltage is applied, the amount of generated light is somewhat reduced, but the life span is substantially increased. Therefore, when setting the number of light emitting elements 15 according to the electrical conditions, it is recommended to make the power supply voltage lower than the product of the nominal rated voltage and the number of the light emitting elements. In case of parallel connection, the electrical conditions have virtually no influence in setting the number of light emitting elements 15 to be contained in the tube 12, although relationship between the power supply voltage and the nominal rated voltage of a single light emitting element 15 has to be taken into consideration.

Although the conducting members 19 led out of the light emitting elements 15 may be used as a means to link in a chain-like manner light emitting elements 15, other members than the conducting members 19 may be used for that purpose. In cases where the light emitting elements 15 are connected in series, a simplified configuration can be provided by connecting the conducting members 19 of the light emitting elements 15 directly to one another or connecting the conducting members 19 through conducting wires 16 which are disposed between each two conducting members 19. In cases where the light emitting elements 15 are connected in parallel, the light emitting elements 15 have to be arranged in the state where they are electrically insulated, though a part of the conducting members 19 can be used.

Further, a cap 14 or caps 14 are attached to one end or both ends of the tube 12 respectively. In case of a single-cap type, where only one end is provided with a cap, the other end is blocked with an appropriate blocking element. The light emitting element series, however, has to be secured in the state where the conductive element 21 is secured at a specified position at the blocked end of the tube 12 by a suitable means. It is also necessary to insulate the conductive element 21 which is located at the blocked end by means of, for example, covering the conductive element 21 with an insulation sleeve, and then folding back the conductor in the tube 12 or directing the same along the outer surface of the tube 12 and into the cap 14 at the one end of the tube 12.

On the other hand, in case of a dual-cap type, where both ends are provided with caps, the conductive element 21 drawn out of each end of the light emitting element series 13 is first positioned by means of the partition 26 of the corresponding cap 14 and then connected to the contact 24.

Each cap 14 is formed of molded synthetic resin. Its barrel portion 25 is structured such that one of its ends is fitted over an end of the tube 12 from outside while the other end is open, and a partition 26 is provided at the middle of the barrel portion 25. This means that the barrel portion may have any outline shape and outer structure as long as its inside structure is tubular. Means of connecting the barrel portion 25 and the tube 12 together is not limited to one means but various methods are permissible, including bonding by using an adhesive, insertion by force, welding and so on.

Although it is preferable that a partition 26 is integrally formed with a cap 14, it may be formed separately as needed. While the distance between the partition 26 in a barrel portion 25 and the tube 12 is limited, there is no limitation in the distance between the partition 26 and the open end of the barrel portion. Further, a partition 26 is a member whose principal object is positioning of the light emitting element series 13 near the corresponding end of the tube 12 so as to position the light emitting element series 13 virtually at, for example, the center of the tube 12. If it is necessary, however, a partition 26 may have a function of securing the light emitting element series 13 by means of tensile force.

In order to bring out a conductive element 21 of the light emitting element series 13, a through hole 30 in the shape of, for example, a semi-circle is formed in a partition 26 so that a conductive element 21 is brought out of the through hole 30 to the other side of the partition 26 and is then positioned and electrically connected to the contact 24. In case of a single-cap type, the conductive element 21 at the other end, which has been folded, should also be brought out through said through hole 30 or, in the same manner as above, through another through hole 30, which is formed separately from said through hole 30, and connected to another contact 24 which, too, is formed separately from said contact 24.

A contact 24 is disposed in a cap 24 so as to feed electric power from a power source to the light emitting element series 13. Connection of a contact 24 to a conductive element 21 can be simplified by disposing the contact in such a way that its base end is located between the partition 26 and the opening 28 inside the barrel portion 25 of a cap 14, but this configuration is not an essential condition. However, the operating portion, i.e. the tip, of a contact 24 has to be exposed to the outside of the cap 14 and inserted into a socket device for electrical connection to the power source. A contact 24 may have a desired structure and a shape. In other words, its structure or a shape may be freely selected from among various existing means, such as a contact pin, a plug-in blade, a contact point, etc.

Although the typical numbers of contacts 24 to be provided in case of a single-cap type and a dual-cap type are one and two respectively, a desired number of contacts may be provided in cases, for example, where it is necessary to selectively turn some of the light emitting elements 15 of a light emitting element series 13 on and off.

The direction in which a contact 24 is disposed with respect to a cap 14 is not specifically limited, but it is typically disposed perpendicular to the axis of the tube 12. With the contacts thus disposed, it is easier to mount the light emitting device 1 virtually parallel to the mounting surface.

An opening 28 at the other end of a barrel portion 25 is useful for an assembly operation such as taking out through the through hole 30 of a partition 26 a conductive element 21 of the light emitting element series 13, which is in the state inserted in the tube 12, and connecting said conductive element 21 to a contact 24. That is, a conductive element 21 can be easily pulled out by inserting a cutting pliers, a pair of tweezers, or any other manipulating tool through the opening 28, and it is also possible to insert a conductive element 21 into a contact 24 and bonding them with pressure by means of inserting a crimping device through the opening 28 or spot-welding them to each other by inserting electrodes of a spot-welding device through the same.

A blocking element 23 is provided in order to cover an opening 28 at the other end of a barrel portion 25 so as to protect a conductive element 21 and a battery portion of a contact 24 disposed in a cap 14, and may have any structure. Also, it is possible to provide a way to prevent the blocking element 23 from inadvertently slipping off the opening 28 of the cap 14 by using the elastic force of the material of a cap 14 and/or the blocking element 23 to fit, press or bond a blocking element 23 to an opening 28.

Next, the second embodiment of the present invention is explained hereunder referring to FIGS. 5 to 10. In the explanation, the components having the same structures or the functions as those in the first embodiment are identified with the same reference numerals.

In said drawings, a lighting device comprises a light emitting device 1, a pair of socket devices 2 and a base which is not shown.

Figure 7:
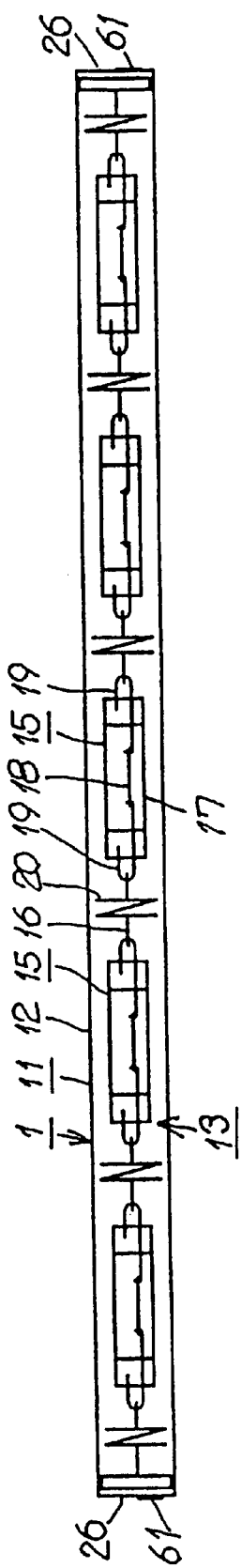
FIG. 7 is a front view of a light emitting device.

In FIG. 7, the light emitting device 1 has a tubular light emitter 11 which is comprised of a tube 12 and a light emitting element series 13. A pair of caps 14 (shown in FIGS. 5 and 6) are respectively attached to the two ends of the tube 12.

The tube 12 of the tubular light emitter 11 is a transparent, straight glass tube having a circular section and open at both ends.

The light emitting element series 13 consists of a plurality of light emitting elements 15 (for example five light emitting elements) linked by means of conductive wires 16. Each light emitting element 15 is an incandescent lamp having an elongated bulb 17 made of transparent glass. The bulb 17 has a filament 18 contained therein and generally U-shaped conducting members 19 which are respectively led out from pinched sealing portions formed at the two ends of the bulb 17. The bulb 17 is filled with xenon gas. A ring-shaped position restricting element 20, which serves as a tension applying element, a position restricting element for restricting the position with respect to the inner surface of the tube 12 and also as a vibration prevention means, is integrally coiled around the middle portion of each conductive wire 16. The light emitting element series 13 is formed as an integral body, with the conducting members 19 of the light emitting elements 15 welded to the conductive wires 16.

A partition (end member) 26 is attached to each one of the two open ends of the tube 12. Hooking elements 61 are formed by bending the end of each respective conductive wire 16 at both ends of the light emitting element series 13, and hooking elements 61 formed as above are engaged with the respective partitions 26.

The light emitting element series 13 is so arranged in the tube 12 as to be virtually coaxial with the tube, with the hooking elements 61 at both ends thereof engaged with the respective partitions 26 under the tensile force of the conductive wires 16. As a result, an appropriate tensile force applied by the conductive wires 16 constantly pulls and supports the light emitting element series 13 at a position where the light emitting elements are regularly arranged. As tensile force is also applied to the partitions 26, the partitions 26 can be attached to the tube 12 simply by fitting them to the open ends of the tube without the danger of inadvertent dislocation.

The assembly operation is done by engaging one of the hooking elements 61 of the light emitting element series 13 with one of the partitions 26; inserting the light emitting element series 13 into an end of the tube 12 with the other hooking element 61 head-first; and then, in the state where the other partition 26 is fitted to the other end of the tube 12, inserting a jig through said other partition 26 into the tube 12 so as to draw out the other hooking portion 61 and engage it with the partition 26.

Figure 8:
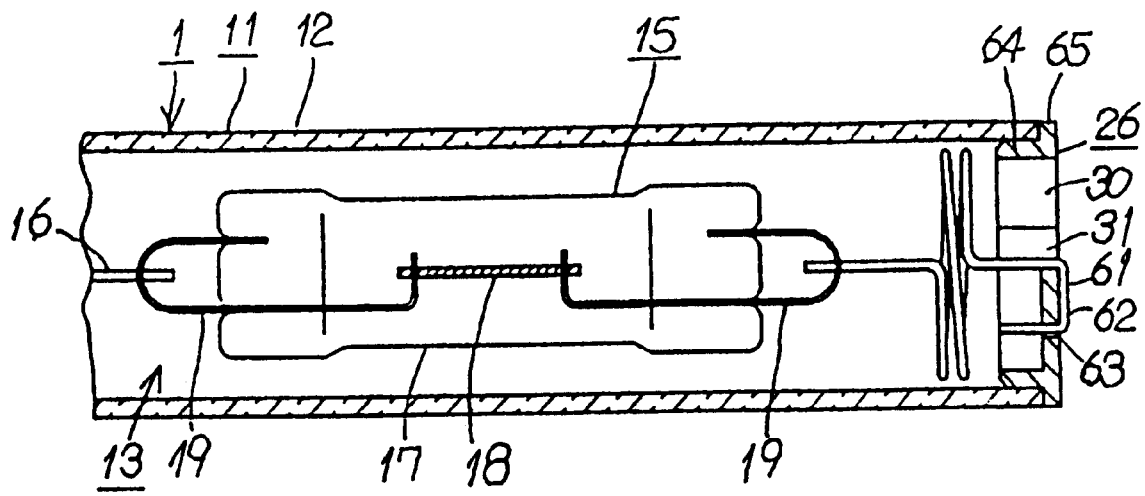
FIG. 8 is an enlarged sectional view of a part of the light emitting device.
Figure 9:
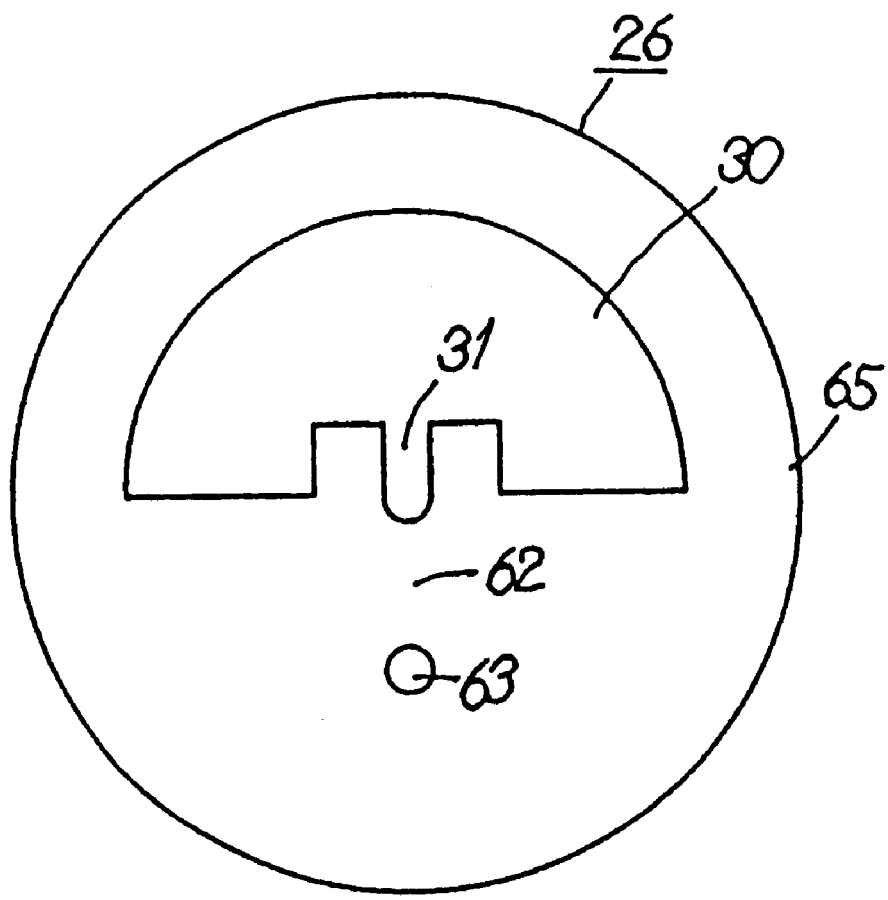
FIG. 9 is an enlarged front view of a partition.
Figure 10:
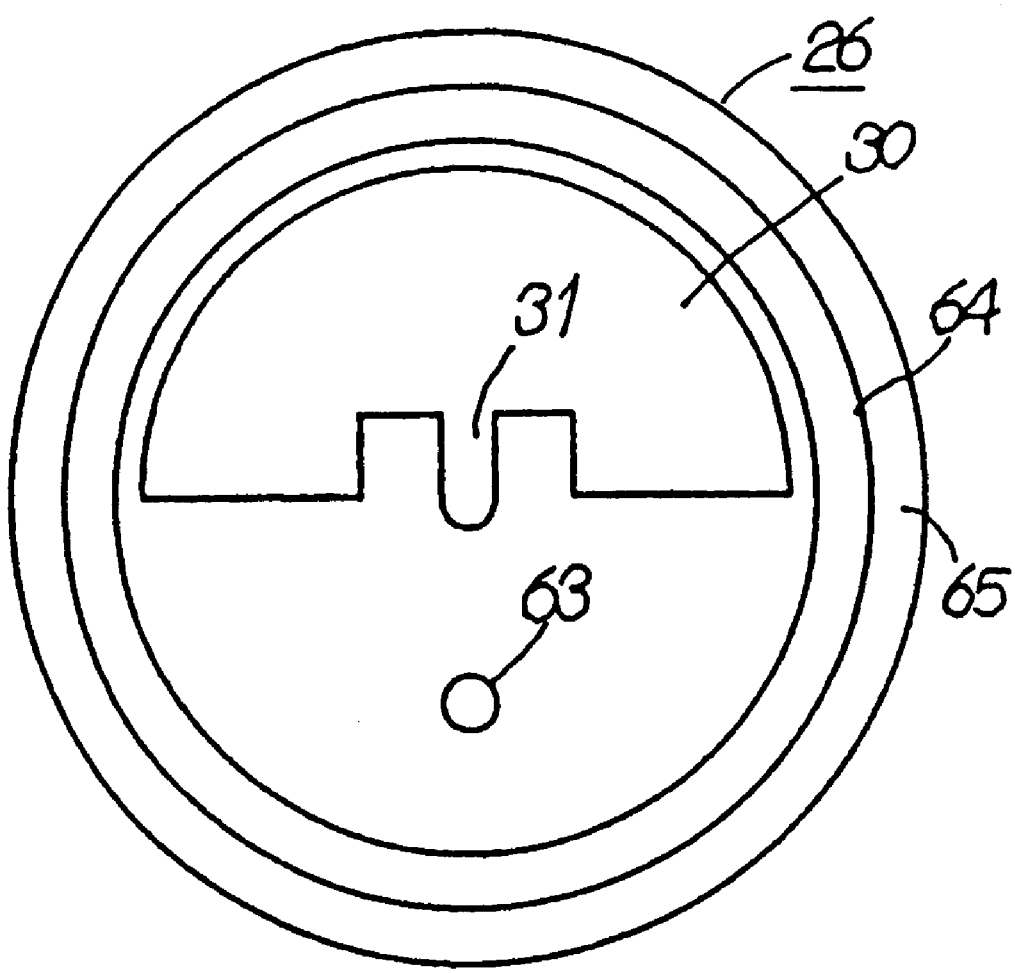
FIG. 10 is an enlarged back view of a partition.

Referring to FIGS. 8 to 10, each partition 26 is provided with a through hole 30 having an area approximately a half of the vertical cross section of the tube 12 and a groove-like positioning portion 31, which is located at the center of the chord (the straight-line portion) of the outline of the through hole 30. Each partition 26 is also provided with a hooking element abutting portion 62, a hooking element catching hole 63, a cylindrical portion 64 and a brim 65, the hooking element abutting portion 62 and the hooking element catching hole 63 serving for engagement of the hooking element 61, and the cylindrical portion 64 and the brim 65 serving for attaching the partition 26 to an end of the tube 12. The cylindrical portion 64 is fitted into the tube 12, thereby preventing the partition 26 from shifting sideways, while the brim 65 is in abutment with the end of the tube 12 so as to restrict movement of the partition 26 in the axial direction of the tube 12.

Each cap 14 is comprised of a cap body 22 and a contact 24.

Said cap body 22 is made of an insulating synthetic resin such as polycarbonate resin and includes a barrel portion 25 and a pair of catching arms 27. The barrel portion 25 is in a cylindrical shape open at one end only, which is fitted around the outer surface of the end of the tube 12. A cap flat portion 29 is formed on a part of the wall of the barrel portion 25, between the pair of catching arms 27. A step portion 66 for catching the partition 26 at the corresponding end of the tube 12 is formed on the inner wall of the barrel portion 25, at about the midpoint along the axial direction of the tube. Therefore, each partition 26 is positioned at the middle of the inside of a barrel portion 25 and thus constitutes a part of a cap body 22. Further, the tube 12 is bonded to a cap body or cap bodies 22 at need.

The contact 24 is a conductive pin which is formed at a location closer to the other end of the barrel portion 25 than is the partition 26 and projects through the center of the cap flat portion 29 of the barrel portion 25, at an approximately right angle to the axis of the cap body 22. Thus structured contact 24 is electrically connected to the corresponding hooking portion 61 through the conductive element 21.

The pair of catching arms 27 are formed as an integral body with the barrel portion 25 and project downward respectively from the two opposite sides of the barrel portion 25 so that the catching arms 27 respectively face the sides of the contact 24 that projects from the barrel portion 25. A catching protrusion 32 protruding inward is formed at the end of each catching arm 27.

Each socket device 2 basically comprises a socket body 41, a packing 42, a receiving blade 43 and a lid 44.

The socket body 41 is made of an insulating synthetic resin such as polybutylene terephthalate resin and includes a socket flat portion 45 formed on its upper surface (the end face). An insertion hole 46 that allows the corresponding contact 24 to be inserted therein is formed at the center of the socket flat portion 45, and an annular circumferential groove 47 for housing the packing 42 therein is formed around the insertion hole 46. A slanted surface 48 and a catching indentation 49 for catching the catching protrusion 32 of the corresponding catching arm 27 therein are formed on each of the two opposite sides of the socket body 41. Each catching indentation 49 is located directly under the corresponding slanted surface 48 as an integral, continuous body with the slanted surface 48. The inside of the socket body 41 is formed into a hollow portion 50 which communicates with the insertion hole 46, and an opening 51 communicating with the hollow portion 50 is formed at the bottom of the socket body 41 and blocked by the lid 44.

The packing 42, which may be an O-ring, is so disposed that a part of the packing contained in the circumferential groove 47 protrudes above the upper surface of the socket flat portion 45 when no pressure is applied to the packing 42. The receiving blade 43 is made of a conductive metal, has a tubular shape, and is disposed in the insertion hole 46 so as to permit the contact 24 to be inserted therein and removed therefrom. The receiving blade 43 is integrally provided with a terminal portion 67, which is disposed along the bottom surface of the socket body 41. A power line 57 is connected to said terminal portion 67.

A power line insertion hole 68 for disposition of a power line 57 is formed between the socket body 41 and the lid 44.

The second embodiment described above has the same functions and effects as those of the aforementioned first embodiment.

The structural features, functions and effects according to the second embodiment are explained hereunder.

A feature of the second embodiment lies in inclusion of a translucent, rigid and elongated tube 12 of which at least one end is open; a light emitting element series 13 comprised of a plurality of light emitting elements 15 connected to one another; conductive wires 16 for applying tensile force to the light emitting element series 13; a partition 26 or partitions 26 to be removably attached to the open end or the open ends of the tube 12; and hooking elements 61 respectively disposed at opposite ends of the light emitting element series in such a manner that at least one of the hooking elements is hooked to a partition 26 while the other hooking element is hooked to either the corresponding partition 26 or the end of tube 12, the hooking elements 61 thus suspending the light emitting element series that extends in the tube 12, along the axis of the tube 12, under the tensile force applied by the conductive wires 16. As this configuration calls for suspending a light emitting element series 13 in a tube 12 by providing the light emitting element series 13 with conductive wires 16, disposing a hooking element 61 at each end of the conductive wires 16 and hooking the hooking elements 61 to the partitions 26, assembly of the light emitting element series 13 is easy. As the light emitting element series 13 is suspended under its tensile force, the structure presents additional effects in that the light emitting element series 13 is arranged in a more orderly fashion and is less affected by vibration. Furthermore, as the tensile force also works on the partitions 26, it is possible to attach the partitions 26 to the tube 12 without the need of a bonding operation.

Another feature of the second embodiment lies in inclusion of an elongated tube 12 which is heat resistant, translucent, rigid and open at both ends; a light emitting element series 13 comprised of a plurality of light emitting elements 15 connected to one another; conductive wires 16 for applying tensile force to the light emitting element series 13; partitions 26 to be respectively attached to the open ends of the tube 12; and hooking elements 61 respectively disposed at both ends of the light emitting element series and hooked to the respective partitions 26 so as to suspend along the axis of the tube 12 the light emitting element series 13 that extends in the tube 12, under the tensile force applied by the conductive wires 16. The tube 12 is heat resistant and open at both ends. Therefore, it is possible to use incandescent lamps requiring a relatively high power consumption, such as high output lamps filled with xenon gas, can be used as light emitting elements 15. One pair of partitions 26 are used so that each open end of the tube 12 is provided with a partition 26.

A light emitting element series 13 according to the embodiment has a feature wherein its light emitting elements 15 are connected to one another by means of conducting members 19. This feature is suitable for a configuration wherein light emitting elements 15 are connected in series. As conducting members 19 also serve as the connecting means, the structure is simplified.

Conductive wires 16 according to the embodiment has a feature wherein they are respectively disposed at both ends of each light emitting element 15 and restrict positions of the light emitting elements 15 with respect to the tube 12. As the conductive wires 16 are respectively disposed at both ends of each light emitting element 15 regardless of a total number of light emitting elements 15 provided, it is easier for the tensile force to be applied to the light emitting elements 15 evenly. In addition, the conductive wires 16 restrict the position of each respective light emitting element 15 on a plane perpendicular to the length of the tube 12 so as to prevent the light emitting elements 15 from touching or approaching too close to the inner surface of the tube 12. Therefore, the above feature makes it easy to arrange the light emitting elements 15 along the axis of the tube 12. As a result of the positional restriction described above, the light emitting elements 15 can be made more vibration-proof.

Yet another feature of the embodiment lies in that each partition 26 has a through hole 30, a hooking element abutting portion 62 and a hooking element catching hole 63. As a through hole 30 is formed in a partition 26, an assembly operation in cases where the tube 12 is open at both ends can be executed by engaging one of the hooking elements 61 of the light emitting element series 13 with one of the partitions 26; then, inserting the light emitting element series 13 into the tube 12 and fitting the one partition 26 to one of the open ends of the tube 12; then, from the direction of the other end, fitting the other partition 26 to the other open end; and inserting a jig from the outside of the partition 26 through the through hole 30 into the tube 12 so as to draw out the other hooking portion 61 against the tensile force of the conductive wires 16 and engage it with the hooking element catching hole 63. At that time, the hooking element 61 comes into contact with the hooking element abutting portion 62 of the partition 26. As a result of this engagement of the hooking portion 61 with the hooking element catching hole 63, the position of the light emitting element series 13 is restricted to a specified direction with respect to the tube 12. In cases where the tube 12 is open only at one end with its other end virtually closed, too, it is possible to engage one of the hooking elements 61 of the light emitting element series 13 with the catching portion of the closed end at first, and then insert a jig through the through hole 30 of the partition 26 at the other end so as to draw out the hooking portion 61 and engage it with the hooking element catching hole 63. Thus, an assembly operation can be done by following a procedure similar to the one for a tube open at both ends.

According to yet another feature of the embodiment, each light emitting element 15 is comprised of an incandescent lamp including a bulb 17, a filament 18 disposed in the bulb 17 and conducting members 19 respectively led out from sealing portions formed at both ends of the bulb 17. The drawings show a preferable configuration in cases where the light emitting elements 15 are incandescent lamps, and especially suitable for serial connection, because an incandescent lamp has conducting members 19 at both ends. However, the present invention is not limited to electrically serial connection; if necessary, it can be made applicable to parallel connection by achieving electrical connection and mechanical connection of the light emitting elements 15 respectively through separate mechanisms.

Yet another feature of the embodiment lies in that the embodiment has said tubular light emitter 11, and a cap 14 or caps 14 for enclosing at least the end of the tube 12 which has a partition 26, the cap 14 including a contact 24 electrically connected to a light emitting element 15. Lamps of a both dual-cap type and a single-cap type can be provided according to this feature; in case of a dual-cap type, two caps 14 are respectively provided at both ends of the tube 12 so as to enclose both partitions 26, and, in case of a single-cap type, a cap 14 is provided at one end of the tube 12 in the same manner. In the latter case, another capping member may be provided at the other end as needed. In cases where said other end, too, has a partition 26, said other capping member may be mounted in such a way as to enclose this partition 26 in order to modify the appearance. Each cap 14 includes a contact 24. The direction in which the contact 24 is connected to a socket device 2 may be the axial direction of the tube 12, perpendicular to the same or at an angle midpoint between these two directions, or the direction may be changeable instead of being oriented in a fixed direction.

Yet another feature of the embodiment lies in that the embodiment has said light emitting device 1, and a socket device or socket devices 2 which function together with the cap(s) 14 of the light emitting device 1 in order to mechanically support the light emitting device 1 and supply power to the light emitting device 1. Either or both cap(s) 14 and socket body (bodies) 41 may be provided with fallout prevention means. At need, this means may be released from the function of preventing inadvertent dislocation so as to accommodate such purposes or operations as changing lamps, maintenance or the like.

According to yet another feature of the embodiment, the embodiment includes a base 3, a socket device or socket devices 2 provided on the base 3, and said light emitting device 1 removably attached to the socket device(s) 2. The base 3 may be formed of metal or synthetic resin. This feature provides a lighting device which can be used in the same manner as a normal lighting device for general illumination.

Figure 11:
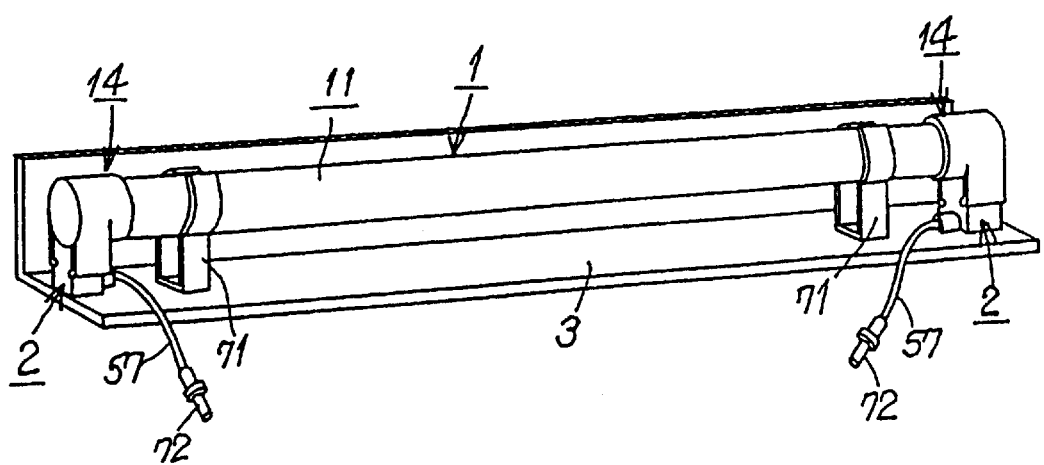
FIG. 11 is a perspective view of a lighting device according to a third embodiment of the present invention.

Next, the third embodiment of the present invention is explained hereunder referring to FIG. 11. In the explanation, the components having the same structures or the functions as those in the first embodiment are identified with the same reference numerals.

According to this embodiment, a light emitting device 1 is the same as those in the other embodiments explained above, and each socket device 2 has a structure wherein a power line 57 is introduced from the top of the base 3. Base 3 is formed of a metal plate bent into a shape having an L-shaped cross section. Holders 71 are mounted on the base 3 in order to prevent the light emitting device 1 from inadvertent falling off. A connector 72 for connection of a power line 57 is connected to the end of each power line 57.

The third embodiment described above, too, has the same functions and effects as those in any one of the foregoing embodiments.

Further, the base may have a box-like case and/or a light projecting cover at need.

Next, the fourth embodiment of the present invention is explained hereunder referring to FIGS. 12 to 18. In the explanation, the components having the same structures or the functions as those in the first embodiment are identified with the same reference numerals.

Figure 17:
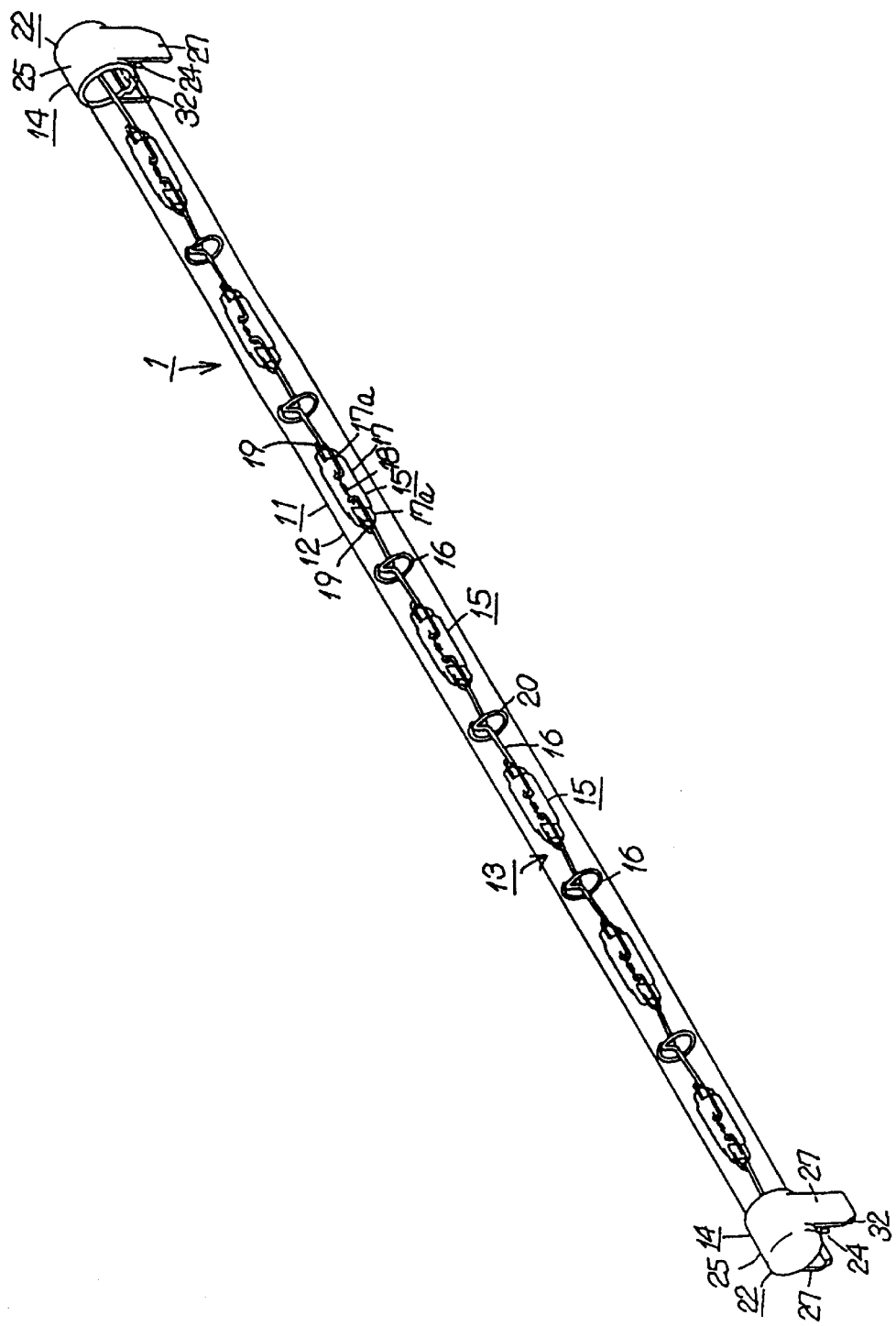
FIG. 17 is a perspective view of a light emitting device.
Figure 18:
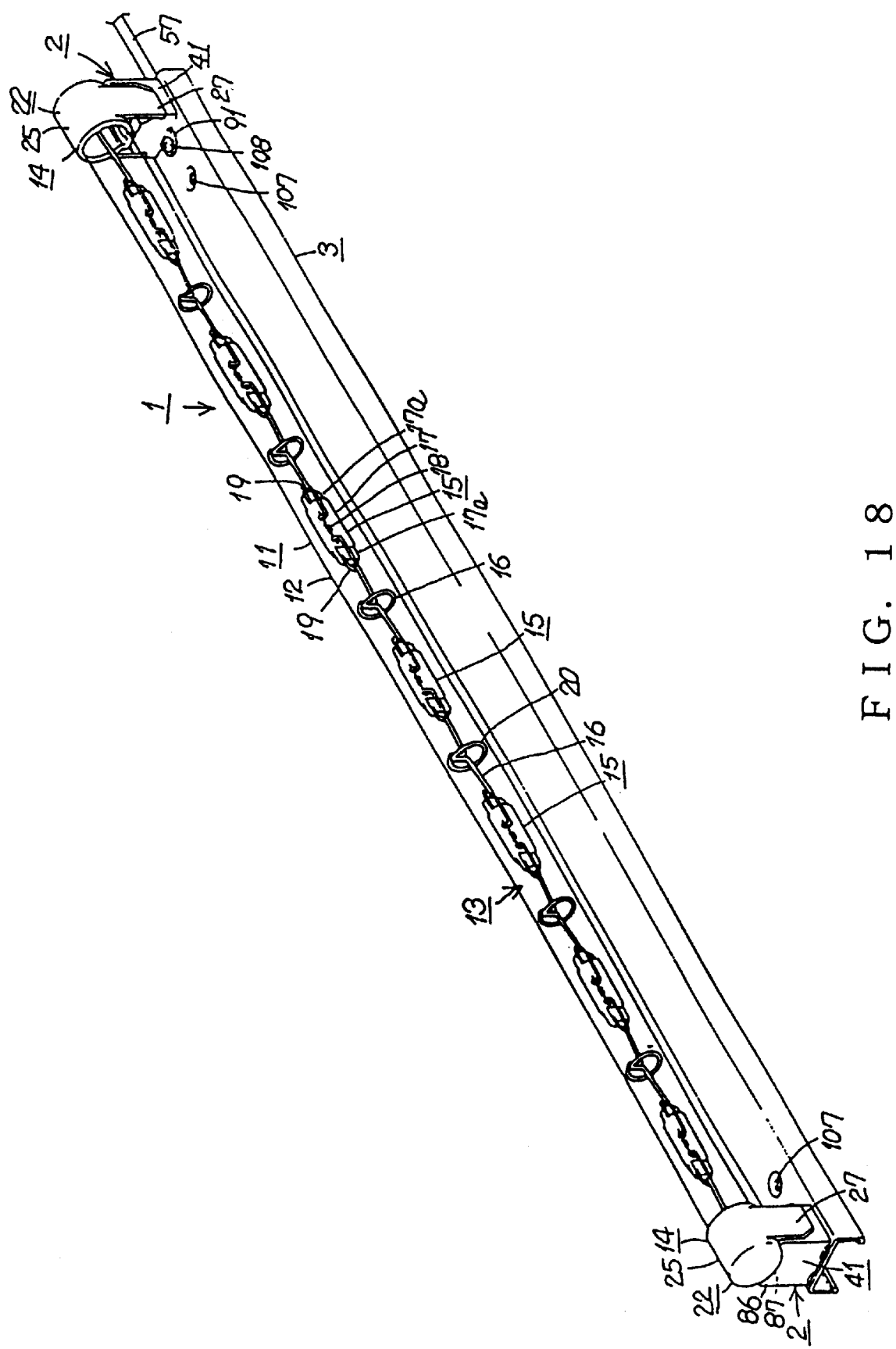
FIG. 18 is a perspective view of the lighting device.

In FIGS. 17 and 18, numeral 1 denotes a light emitting device. Said light emitting device 1 includes a tubular light emitter 11 having caps 14 respectively attached to both ends of the light emitter. The axial length of the tubular light emitter 11 virtually corresponds to the length of a 20 W straight-tube fluorescent lamp.

The tubular light emitter 11 has a cylindrical tube 12 made of transparent glass or plastic and containing a plurality of light emitting elements 15 connected to one another along the axis of the tube.

Each light emitting element 15 is an incandescent lamp wherein a filament 18 extending along the axis of the tube is disposed at the center of the inner space of a transparent, cylindrical bulb 17, and a conducting member 19 connected to each end of the filament 18 is projected from each end of the bulb 17. Each end of the bulb 17 is sealed by a flat sealing portion 17a, to which the middle portion of the corresponding conducting member 19 is affixed. The conducting member 19 protruding from each sealing portion 17a is bent into a U-like shape parallel to the flat surface of the sealing portion 17a.

Figure 13:
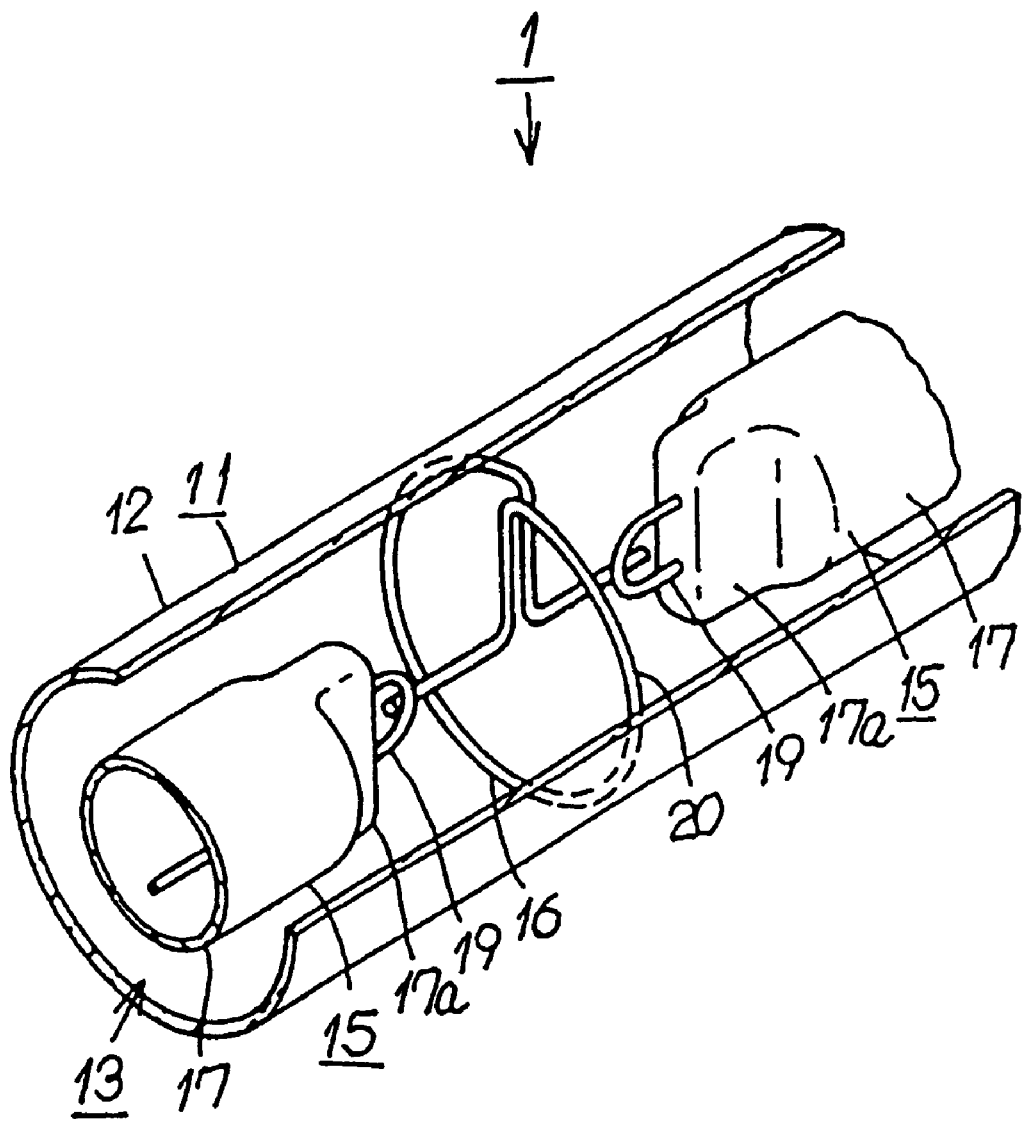
FIG. 13 is a perspective view of a part of a light emitting device.

Adjacent light emitting elements 15 are electrically and mechanically connected to each other through conductive wires 16. As shown in FIG. 13, each conductive wire 16 is formed of a wire which is electrically conductive, with each end connected to a conducting member 19 of the light emitting element 15 adjacent thereto, and has at its middle portion a position restricting element 20 serving as an abutment portion which comes into contact with or comes close to the inner wall of the tube 2. Each conductive wire 16 has elasticity in such a direction as to bring both light emitting elements 15 connected to the wire 16 closer to each other. The engaging point of each conductive wire 16 may be secured by means of welding or soldering. These light emitting elements 15 and conductive wires 16 constitute a light emitting element series 13.

Figure 12:
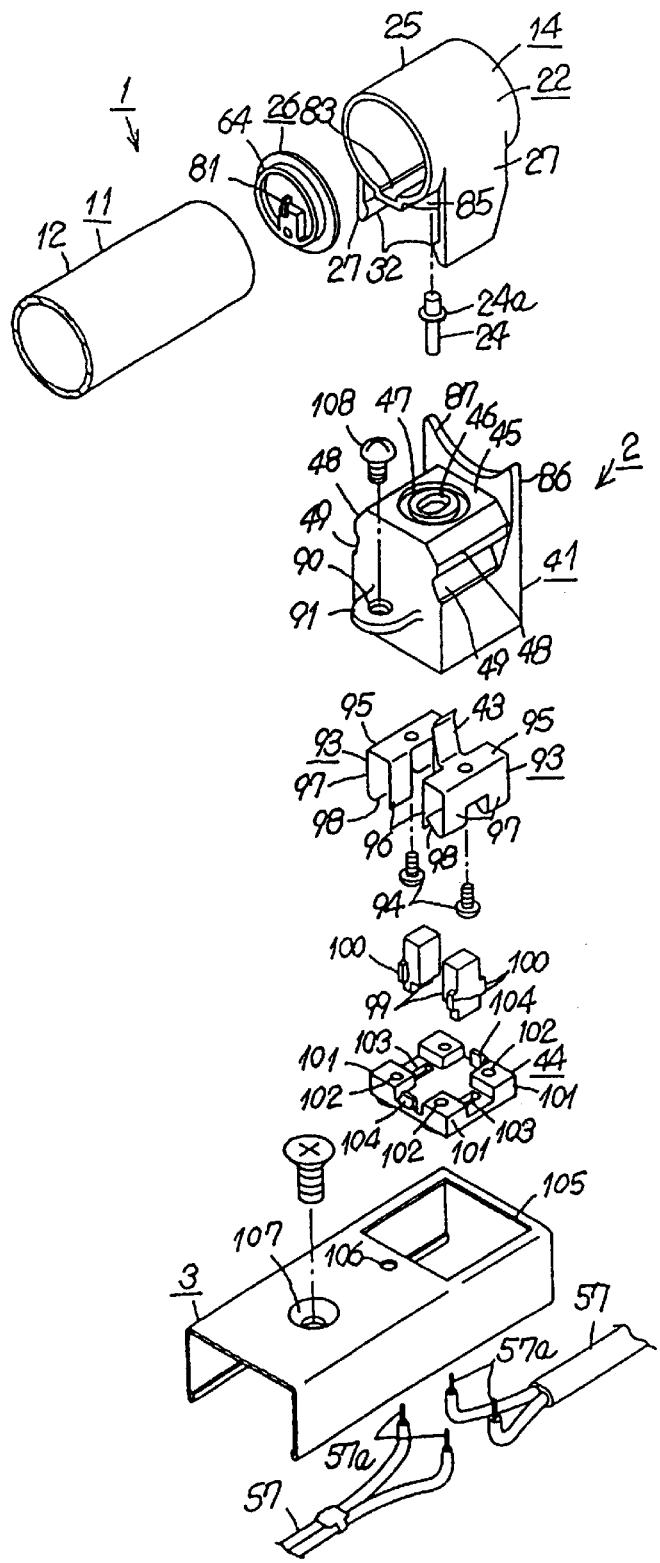
FIG. 12 is an exploded perspective view of a part of a lighting device according to a fourth embodiment of the present invention.
Figure 14:
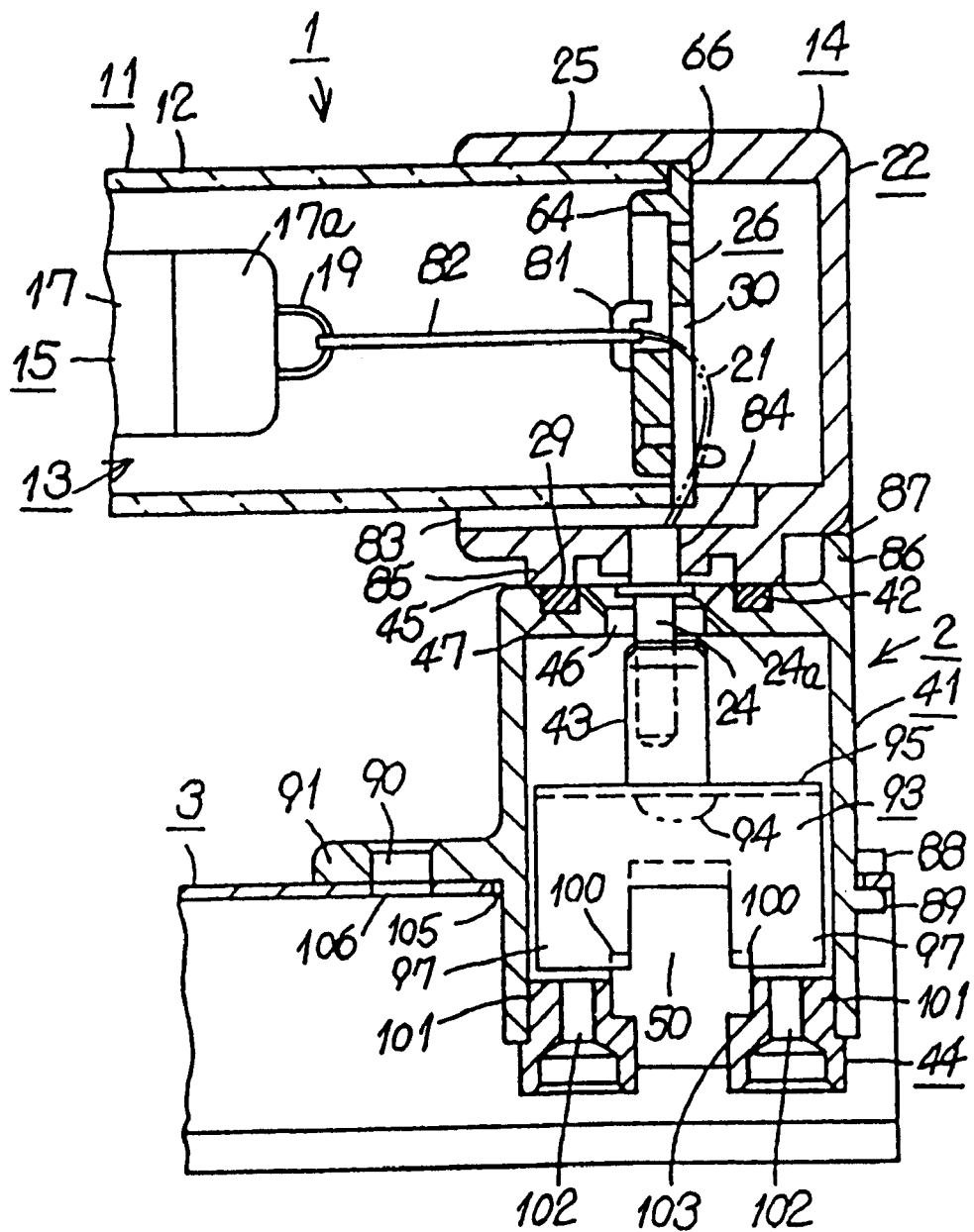
FIG. 14 is a side view of a part of the lighting device.
Figure 15:
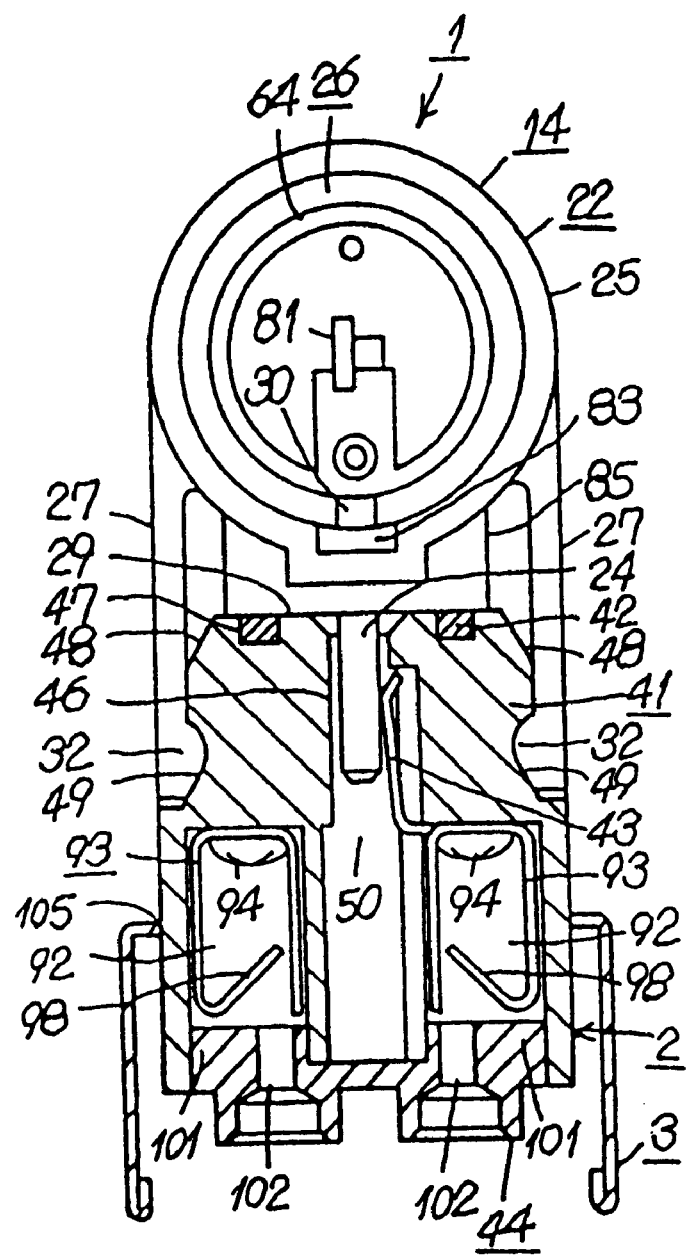
FIG. 15 is a sectional view of a part of the lighting device.
Figure 16:
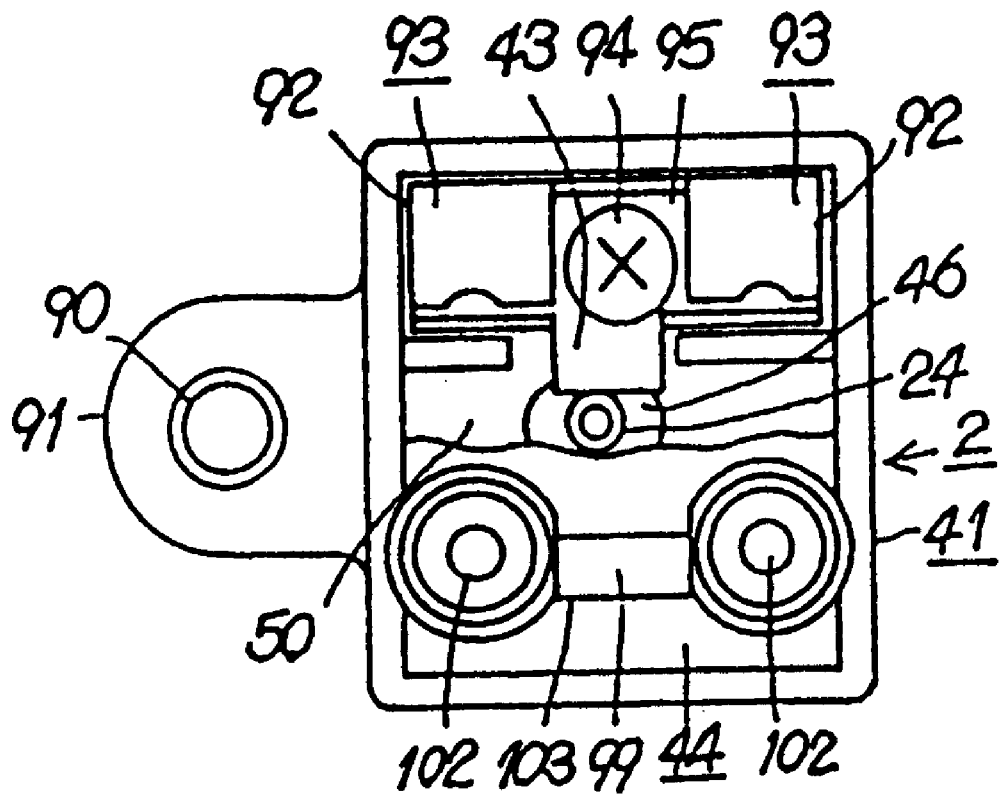
FIG. 16 is a bottom view of a socket device.

As shown in FIGS. 12 and 14, and 15 a partition 26 is attached to each end of the tube 12. Each partition 26 is formed of an insulating material, such as synthetic resin, into a disk having nearly the same diameter as that of the tube 12. Formed on the inner side of each partition 26 are a cylindrical portion 64 to be fitted in the tube 12, and a hook 81 located at the center of the partition. Also, a slit-like through hole 30 is formed at the region from the center, at the location facing the hook 81, to the lower edge of the partition.

While one end of a conductive wire member 82 is securely hooked to the outer conducting member 19 of each outermost light emitting element 15, the other end of the wire member 82 is securely hooked to the corresponding hook 81 so that the partitions 26 are supported at such a state as to be fitted to the ends of the tube 12 by the elasticity of the conductive wires 16 that connect the light emitting elements 15 to one another.

Each cap 14 is provided with a socket 41 which is formed of an insulating material, such as synthetic resin, and includes a cylindrical barrel portion 25 open at one end. A step portion 66 for catching an end of the tube 12 with a partition 26 therebetween is formed in the barrel portion 25, and a groove 83 extending along the axis of the tube 12 is formed in the lower part of the interior of the barrel portion 25. A fixing hole 84 extending perpendicular to the axis of the tube is vertically bored through the bottom of the groove 83, and an annular protrusion 85 protruding from the lower surface of the barrel portion 25 is formed around the fixing hole 84. A cap flat portion 29 is formed on the lower surface of the annular protrusion 85.

The barrel portion 25 has a pair of catching arms 27 respectively projecting downward from the two opposite sides (the sides aligned perpendicularly to the axis of the tube) of the barrel portion 25, and a catching protrusion 32 protruding inward is formed at the inner end of each catching arm 27, the two catching protrusions 32 positioned so as to face each other.

A contact 24 projects from the lower surface of each cap 14. Said contact 24 is made of a conductive material, such as metal. An annular rib 24a is formed at the middle of each contact 24 so that the contact 24 can be forced into the fixing hole 84 of a cap 14 and secured therein with the upper surface of the rib 24a engaged in the fixing hole 84.

Then, the assembly of the light emitting device 1 is completed by connecting each wire member 82 hooked to the hook 81 of the corresponding partition 26 of the tube 12 to the contact 24 affixed to a cap 14 by means of a conductive element 21 made of a lead wire or the like and then snugly inserting both ends of the tube 12 into the respective cap 14 so as to secure the tube 12.

Next, referring to FIG. 12 and FIGS. 14 to 16, the socket body 41 of each socket device 2 is made of an insulating material, such as transparent, semi-transparent or milky white synthetic resin, and a socket flat portion 45 to which a cap 14 is to be connected is formed on the upper surface of the socket body. An insertion hole 46 that allows a contact 24 to be inserted therein is vertically bored through the socket flat portion 45, and an annular circumferential groove 47 is formed around the insertion hole 46. The insertion hole 46 is a hole elongated parallel to the direction of the axis of the light emitting device 1.

Each socket body 41 is provided with a slanted surface 48, which is formed at the upper corner of each side (each one of the two opposite sides aligned perpendicularly to the axis of the light emitting device 1) of the socket body 41, and a catching indentation 49 formed under the slanted surface 48 in such a manner that the catching indentations 49 allow the catching protrusions 32 of the respective catching arms 27 of a cap 14 to be removably fitted therein.

A supporting plate 86 protruding upward is formed along the outer end of each socket body 41, the upper end of the supporting plate 86 formed into an arc-shaped fitting surface 87 for fittingly receiving the bottom edge of the outer end of the barrel portion 25 of a cap 14. Sandwiching protrusions 88,89 are also formed on the outer end face of each socket body 41, the two sandwiching protrusions 88,89 at vertically separated locations. Further, a mounting piece 91 having a mounting hole 90 protrudes from the inner end face of each socket body 41.

The center part of the inside of the socket body 41 is formed into a hollow portion 50 which communicates with the insertion hole 46 and is flanked by a pair of terminal housing portions 92. The hollow portion 50 and the terminal housing portions 92 are all open at the bottom of the socket body 41.

Each terminal housing portion 92 houses a terminal 93, which includes a base plate 95 to be fastened to the top of the terminal housing portion 92 by means of a screw 94. Connecting pieces 96,97 are formed by bending each side of the base plate 95 downward, the lower part of each connecting piece 97 is divided into two portions. A pair of locking pieces 98 extending diagonally upward are formed by bending the two lower portions of each connecting piece 97 that is adjacent to an inner wall of the socket body 41. A receiving blade 43 which is formed on one of the pair of terminals 93 is capable of entering into the hollow portion and coming into contact with a contact 24 inserted through the insertion hole 46.

Each terminal housing portion 92 is provided with a release button 99 disposed in the space defined by the connecting pieces 96,97 and the pair of locking pieces 98 of the terminal 93 in such a way as to be vertically slidable. Release portions 100 to be positioned under the pair of locking pieces 98 are respectively formed on opposite sides of each release button 99.

A lid 44 is attached to the lower end of each socket body 41 so as to close the bottom of the socket body. Said lid 44 is formed of an insulating material such as synthetic resin and has raised portions 101 respectively formed on the four corners of the upper surface of the lid, each raised portion 101 having a wire insertion hole 102 vertically bored therethrough. A release hole 103 which permits the bottom of the corresponding release button 99 to be fitted therein is formed in each side of the lid 44, while a catching tooth 104 to be caught against the inner wall of the socket body 41 is formed on each end of the lid 44.

Each circumferential groove 47 houses a packing 42, which may be an O-ring or the like, and is disposed in the circumferential groove 47 in such a way that a part of the packing protrudes above the upper surface of the socket flat portion 45 when no pressure is applied to the packing 42.

Next, referring to FIGS. 12 and 18, the base 3, which may be a trough, has a generally U-shaped cross section and has virtually the same length as the light emitting device 1. Formed at each end of the base 3 are a plug-in hole 105 in which the lower part of the corresponding socket body 41 is snugly inserted, a mounting hole 106 and a fastening hole 107, the mounting hole 106 and the fastening hole 107 located closer to the center of the base 3 than is the plug-in hole 105.

With the configuration as above, a socket device 2 can be mounted on each end of the base 3 by inserting the lower portion of its socket body 41 into a plug-in hole 105 of the base 3, catching the edge of the plug-in hole 105 between the vertically arranged sandwiching protrusions 88,89 while bringing the mounting piece 91 into contact with the upper surface of the base 3, and inserting a fastening screw 108 through the mounting hole 90 of the mounting piece 91 and screwing the same into the mounting hole 106 of the base 3.

Then, as shown in FIG. 12, two pairs of core wires 57a, which have been formed by removing the insulation coating from an end of each power line 57, are inserted into the corresponding wire insertion holes 102 of a socket device 2. Each core wire 57a is inserted between the inner connecting piece 96 and the corresponding locking piece 98 of each respective terminal 93 so that the locking piece 98 bites into the core wire 57a, thereby electrically connecting and preventing the core wire 57a from slipping off. The power lines 57 are so attached as to extend along the back of the base 3.

Then, the caps 14 at both ends of the light emitting device 1 are respectively connected to the socket devices 2 at both ends of the base 3, by bringing each cap 14 towards a socket device 2 from above as shown in FIG. 12, positioning the two catching arms 27 to both sides of the socket device 2, and pushing the cap 14 from above into the socket device 2. As a result, the cap 14 is forced into the socket device 2 while the pair of catching arms 27 are being elastically warped outward until the cap 14 is engaged in the socket device 2 with the catching protrusions 32 at the ends of the respective catching arms 27 fitted in the catching indentations 49 of the socket 2.

In the state where said cap 14 of the light emitting device 1 is connected to the socket device 2, the contact 24 of the cap 14 is inserted in the insertion hole 46 of the socket device 2, the contact 24 coming into contact with the receiving blade 43. The annular protrusion 85 of the cap 14 comes into contact with the packing 42 of the socket device 2, while the bottom edge of the outer end of the barrel portion 25 of the cap 14 fits onto the fitting surface 87 of the supporting plate 86.

The insertion hole 45 of each socket device 2 is elongated in the direction parallel to the axis of the tube. Therefore, when the light emitting device 1 is connected, the contacts 24 can be inserted in the respective insertion holes 46 even if there is a discrepancy between the distance between the contacts 24 at both ends of the light emitting device 1 and the distance between the socket devices 2 at both ends of the base 3. Furthermore, in cases where a cap 14 at an end of the light emitting device 1 is connected to a socket device 1 after the cap 14 at the other end of the light emitting device 1 is connected to the other socket device 2, the contacts 24 can be inserted in the insertion holes 46 even if the light emitting device 1 is at an inclined position with respect to the base 3 so that the contacts 24 have to be diagonally inserted into the insertion holes.

A commercially available AC power source is connected to one of the power lines 57. When electric power is supplied through the power line 57, AC current flows between the pair of contacts 24 through the terminals 93 of the socket devices 2 at both ends, and, as a result, the light emitting elements 15 connected in series between the two contacts 24 emit light.

This embodiment described above, too, has the same functions and effects as those of the aforementioned other embodiments.

Of the conductive wires 16 disposed between the respective light emitting elements 15 of a light emitting device according to any one of the embodiments described above, conductive wires 16 which have position restricting elements 20 may be disposed at intervals of a plurality of light emitting elements 15.

The length of a light emitting device 1 in the axial direction of the tube is not limited to the length of a 20 W straight-tube fluorescent lamp but it may be so structured as to have a length corresponding to that of a straight-tube fluorescent lamp of 10 W, 15 W, 40 W or 100 W (a 110 W-type). In that case, the number of light emitting elements 15 should be adjusted according to the length of the light emitting device.

Furthermore, a light emitting device 1 according to any one of the embodiments described above can be used like a straight-tube fluorescent lamp, its usage including an under-shelf light, indirect lighting, a showcase or a display window lighting, a billboard lighting and so forth.

As described above, a light emitting device, a socket device and a lighting device according to the present invention can not only be used for lighting in a similar way as a straight-tube fluorescent lamp but also for a line illumination, wherein a plurality of illuminating devices along the axis of a tube in order to achieve continuity of the light emitting parts, decorative illumination or the like.

What is claimed is:

1. A light emitting device comprising:

light emitter;

a pair of caps, each cap having a cap body to be attached to said light emitter;

a contact to be electrically connected to said light emitter and projecting from said cap body at substantially a right angles to a tube axis;

a pair of catching arms on each said cap;

said pair of catching arms respectively provided at sides of said contact and extending substantially in the same direction as said contact.

2. A light emitting device as claimed in claim 1, wherein:

said light emitter includes a plurality of conductive elements led out of said light emitter;

each cap body includes a barrel portion;

said barrel portion having one end mounted over an end of said light emitter;

a partition is provided at an interior of said barrel portion permitting a corresponding one of said conductive elements to pass therethrough from one side to an other side of said partition;

said one side and said other side of said partition respectively facing said one end and an other end of said barrel portion; and said contact is connected to said plurality of conductive elements at said one side of said partition and projects from said barrel portion.

3. A light emitting device as claimed in claim 1 further comprising:

said light emitter including a plurality of conductive elements led out of said light emitter;

each cap body including a barrel portion;

a partition;

a blocking member;

one end of said barrel portion is mounted over an end of said light emitter;

said partition is integrally formed with said barrel portion at an interior of said barrel portion and permitting corresponding conductive elements to pass therethrough from one side to an other side of said partition;

said one side and said other side respectively facing one end and an other end of said barrel portion; and said blocking member attached to said one end of said barrel portion.

4. A light emitting device as claimed in claim 1, wherein:
said light emitter includes a plurality of conductive elements led out of said light emitter;
each cap body includes a barrel portion;
one end of said barrel portion is mounted over an end of said light emitter;
a partition is provided at an interior of said barrel portion;
said partition includes a positioning portion that positions said conductive element passing from one side to an other side of said partition, and
said one side and other side respectively facing said one end and an other end of said barrel portion.

5. A light emitting device as claimed in claim 1, wherein:
said light emitter includes a plurality of conductive elements led out of said light emitter;
each cap body includes a barrel portion;
one end of said barrel portion is mounted over an end of light emitter;
a partition is provided at an interior of said barrel portion;
said partition having a through hole and a positioning portion;
said positioning portion positions said plurality of conductive elements passing through said through hole from one side to an other side of said partition; and
said one side and said other side of said partition respectively facing said one end and an other end of said barrel portion.

6. A light emitting device as claimed in claim 1, wherein:
each cap body includes a barrel portion having a cap flat portion;
said cap flat portion is formed on a part of a side face of said barrel portion; and
said contact projects from said cap flat portion of said barrel portion.

7. A light emitting device as claimed in claim 1, wherein said light emitter includes:
a rigid, translucent tube; and
a light emitting element series;
said light emitting element series having a plurality of light emitting elements installed in said tube.

8. A light emitting device as claimed in claim 1, further comprising:
a socket body having a hollow portion and an insertion hole;
said insertion hole formed in an end face of said light emitting device;
said insertion hole allowing said contact of said light emitting device to be inserted therethrough;
slanted surfaces are formed on opposite sides of said socket body;
catching indentations are formed to mate with respective slanted surfaces;
a receiving blade is contained in said hollow portion of said socket body permits said contact to be electrically connected thereto; and
a lid blocks said hollow portion of said socket body.

9. A light emitting device as claimed in claim 8, wherein:
said socket body includes a socket flat portion formed around said insertion hole at an end face of said socket body;
an annular circumferential groove is formed in said socket flat portion surrounding said insertion hole; and
a packing is disposed in said circumferential groove.

10. A lighting device comprising:
a base;
a light emitting device including a light emitter and a pair of caps;
said pair of caps each having a insulating cap body to be attached to said light emitter;
a contact effective to be electrically connected to said light emitter;
said contact projecting from said cap body at substantially a right angle to a tube axis;
a pair of catching arms respectively provided at sides of said contact and extending virtually in the same direction as said contact;
a pair of socket devices separately mounted on said base at opposite locations;
each socket device including an insulating socket body, a receiving blade and a lid;
said socket body having an insertion hole formed in an end face of said socket body and allowing said contact of said light emitting device to be inserted therethrough;
said socket body further having a hollow portion;
slanted surfaces are formed on opposite sides of said socket body;
catching indentations are formed to mate with respective slanted surfaces;
said catching indentations being formed to engage said catching arms;
said receiving blade is contained in said hollow portion of said socket body and permits said contact to be electrically connected thereto; and
said lid blocks said hollow portion of said socket body.

11. A light emitting device comprising:
a plurality of light emitting elements electrically coupled to one another and disposed within a housing;
said housing having an inner surface opposite said plurality of light emitting elements;
at least one position restricting element disposed within said housing;
at least one conductive element electrically coupled to said plurality of light emitting elements and said position restricting element;
said position restricting element continuous with said conductive element;
at least one said cap disposed on at least one end of said housing;
and said conductive element extending through said at least one cap;
at least two catching arms extending from said at least one cap parallel to at least a portion of said conductive element
said at least two catching arms substantially perpendicular to said plurality of light emitting elements and effective to engage said housing to an external connective element; and
said position restricting element and said conductive element in combination effective to apply a tension and a position control to said plurality of light emitting elements and prevent said plurality of light emitting elements from contacting said inner surface or said at least one end cap during operation.

12. A light emitting device as in claim 11 further comprising:
a partition with a through hole;
said partition disposed within said cap and communicating with an interior of said housing;
said through hole effective to allow said conductive element to extend through said cap; and
said at least one cap including at least one contact mechanically coupling and electrically connecting to said at least one conductive element.

13. A light emitting device as in claim 12 wherein said light emitting element is integrally formed with said cap.

14. A light emitting device as in claim 12 wherein said through hole is semi-circular in shape.

15. A light emitting device as in claim 12 wherein:
said conductive element has a hook at an end; and
said partition includes an abutting portion for engaging with said hook.

16. A light emitting device as in claim 12, wherein:
said housing is substantially tubular in shape;
said at least one contact is disposed substantially perpendicular to a long axis of said housing; and
said cap has a substantially barrel-shaped interior.

17. A light emitting device as in claim 12, wherein said at least one cap is two caps; and
said two caps are disposed at opposite ends of said housing.

18. A light emitting device as in claim 12, wherein said light emitting elements are in an electrical configuration that is one of parallel and series.

19. A light emitting device as in claim 12, wherein said at least one position restricting element is an electrical conductor and electrically couples said plurality of light emitting elements.

20. A light emitting device as in claim 12, further comprising:
a base with an L-shaped cross section; and
at least one holder mechanically coupling said base to said housing.

21. A light emitting device as in claim 20, further comprising:
a socket having an elongates insertion hole for receiving said conducting element;
receiving means including at least one terminal portion having a locking portion and a release portion;
said locking portion for mechanically and electrically coupling said conductive element to said socket; and
said release portion for disengaging said locking portion.

22. A light emitting device as in claim 21, further comprising:
said cap having an annular protrusion extending therefrom; and
said socket having a circumferential groove for receiving said annular protrusion.

23. A light emitting device comprising:
illumination means having a conductive element at an end thereof;
said conductive element mechanically coupled and electrically connected to a cap through at least one contact;
said at least one contact protecting at a substantially right angle to said illumination means;
at least one position restricting element electrically joined with said conductive element;
at least two catching arms with a catching protrusion extending from said cap at substantially right angles to said light emitting element; and
a socket having at least one catching indentation on an outside surface for mating with said catching protrusion.

24. A light emitting device comprising:
illumination means having a conductive element at an end thereof;
said conductive element mechanically coupled and electrically connected to a cap through at least one contact;
a socket;
coupling means for mechanically coupling said cap to said socket;
said coupling means projecting from said cap at substantially a right angle;
said coupling means including at least two catching arms; and
a packing disposed upon said socket at a junction between said socket and said cap, substantially perpendicular to said illumination means whereby said packing and said coupling means are effective to make said socket waterproof.

25. A light emitting device as in claim 24 further comprising:
at least one catching arm with a catching protrusion extending therefrom; and
said socket having at least one catching indentation for mating with said catching protrusion.

26. A method for making a lighting device comprising the steps of:
electrically coupling at least one light emitting element to a conductive element;
said light emitting element including at least a first filament;
inserting said at least one light emitting element into a housing having at least an inside surface;
placing said conductive element through a first position restriction element and into a first cap;
said first position restriction element including at least a through hole effective to receive said conductive element and a positioning portion formed for effective engagement with said conductive element;
mechanically coupling and electrically connecting said conductive element to said first cap; and
said step of mechanically coupling and electrically connecting mechanically suspends said light emitting element from said position restricting element inside said housing opposite said inside surface, whereby said lighting device effectively operates.

27. A method for making a lighting device as in claim 26, further comprising the steps of;
pulling said conductive element through said housing and through a second position restriction element into a second cap; and
mechanically coupling and electrically connecting said conductive element to said second cap whereby said light emitting element is suspended inside said housing, between said first cap to said second cap, opposite said inside surface.

28. A light emitting device comprising:
at least one illuminating means coupled to a conductive element;

a housing for holding said at least one illuminating means;

at least one position restriction element disposed within said housing;

at least one cap having a through hole, a contact, a partition, and catching arms;

said partition communicating with an inside of said cap and an inside of said housing;

said contact effective to electrically couple said conductive element to said cap;

said catching arms each having catching protrusions;

a socket having a receiving blade, catching indentations, and a packing;

said receiving blade effective to electrically couple said contact to said socket;

said catching indentations effective to mate with said catching protrusions; and said packing disposed at a junction between said socket and said cap.

29. A light emitting device as in claim 28 wherein:

said at least one position restriction element is formed by said conductive element;

said conductive element further forms a hook at an end of said conductive element; and said partition includes a protrusion for mating with said hook.

30. A light emitting device as in claim 29 wherein:

said socket further includes at least one terminal portion having a locking portion and a release portion;

said locking portion for mechanically coupling said conductive element to said socket; and said release portion for disengaging said locking portion.

31. A light emitting device as in claim 30 wherein:

said cap is barrel-shaped with an annular protrusion on a bottom side thereof;

said socket includes a circumferential groove for receiving said annular protrusion;

said socket further includes an arc shaped fitting surface for joining with an external surface of said cap; and a base is connected to a bottom surface of said socket.

32. A method for making a lighting device comprising the steps of:

electrically coupling at least one light emitting element to a conductive element;

inserting said at least one light emitting element into a housing;

placing said conductive element through a first position restriction element and into a first cap;

mechanically coupling and electrically connecting said conductive element to said first cap;

wherein said step of mechanically coupling and electrically connecting includes;

providing an abutting portion on said position restriction element;

forming said conductive element into a hook; and connecting said hook to said abutting portion.

33. A method for making a lighting device comprising the steps of:

electrically coupling at least one light emitting element to a conductive element;

inserting said at least one light emitting element into a housing;

placing said conductive element through a first position restriction element and into a first cap;

mechanically coupling and electrically connecting said conductive element to said first cap;

pulling said conductive element through a second position restriction element into a second cap;

mechanically coupling and electrically connecting said conductive element to said second cap;

wherein said step of mechanically coupling and electrically connecting said conductive element to said first cap includes;

providing an abutting portion on said position restriction element;

forming said conductive element into a hook; and connecting said hook to said abutting portion.

34. A method for making a lighting device comprising the steps of:

electrically coupling at least one light emitting element to a conductive element;

said light emitting element including at least a first filament;

inserting said at least one light emitting element into a housing having at least an inside surface;

placing said conductive element through a first position restriction element and into a first cap;

said first position restriction element including at least a through hole effective to receive said conductive element and a positioning portion formed for effective engagement with said conductive element;

mechanically coupling and electrically connecting said conductive element to said first cap;

said step of mechanically coupling and electrically connecting mechanically suspends said light emitting element from said position restricting element inside said housing opposite said inside surface, whereby said lighting device effectively operates pulling said conductive element through said housing and through a second position restriction element into a second cap; and mechanically coupling and electrically connecting said conductive element to said second cap whereby said light emitting element is suspended inside said housing, between said first cap to said second cap, opposite said inside surface.

* * * * *